(12) United States Patent
Berger

(10) Patent No.: US 8,042,504 B2
(45) Date of Patent: Oct. 25, 2011

(54) ADJUSTING VALVE TIMING TO DEACTIVATE ENGINE CYLINDERS FOR VARIABLE DISPLACEMENT OPERATION

(75) Inventor: Alvin Henry Berger, Brownstown, MI (US)

(73) Assignee: Ford Global Tecnologies, LLC, Dearborn, MI (US)

( * ) Notice: Subject to any disclaimer, the term of this patent is extended or adjusted under 35 U.S.C. 154(b) by 313 days.

(21) Appl. No.: 12/540,406

(22) Filed: Aug. 13, 2009

(65) Prior Publication Data

US 2010/0175645 A1    Jul. 15, 2010

Related U.S. Application Data

(63) Continuation-in-part of application No. 12/351,049, filed on Jan. 9, 2009, now Pat. No. 8,025,035.

(51) Int. Cl.
*F01L 1/34* (2006.01)

(52) U.S. Cl. .................. 123/90.17; 123/90.15; 123/347; 464/160

(58) Field of Classification Search ............... 123/90.15, 123/90.16, 90.17, 90.18, 345, 346, 347, 348; 464/1, 2, 160
See application file for complete search history.

(56) References Cited

U.S. PATENT DOCUMENTS

| | | | |
|---|---|---|---|
| 3,516,394 A | 6/1970 | Nichols | |
| 4,517,934 A | 5/1985 | Papez | |
| 4,770,060 A | 9/1988 | Elrod et al. | |
| 4,771,742 A | 9/1988 | Nelson et al. | |
| 4,917,058 A | 4/1990 | Nelson et al. | |
| 5,136,887 A | 8/1992 | Elrod et al. | |
| 5,156,119 A | 10/1992 | Suga | |
| 5,161,429 A | 11/1992 | Elrod et al. | |
| 5,161,493 A | 11/1992 | Ma | |
| 5,253,546 A | 10/1993 | Elrod et al. | |
| 5,355,849 A | 10/1994 | Schiattino | |
| 5,417,186 A | 5/1995 | Elrod et al. | |
| 5,642,703 A | 7/1997 | Stockhausen et al. | |
| 6,237,559 B1 | 5/2001 | Russ et al. | |
| 7,069,892 B2 | 7/2006 | Lechner et al. | |
| 7,140,335 B2 | 11/2006 | Moretz et al. | |
| 7,273,024 B2 | 9/2007 | Lancefield et al. | |
| 7,284,521 B2 | 10/2007 | Lechner et al. | |
| 7,467,611 B2 * | 12/2008 | McKay et al. ............. | 123/90.17 |
| 2003/0159670 A1 | 8/2003 | Simpson et al. | |
| 2007/0056541 A1 | 3/2007 | Meintschel et al. | |

FOREIGN PATENT DOCUMENTS

WO    88/01337    2/1988

OTHER PUBLICATIONS

Printout from www.nytimes.com/2007/01/14/automobiles/14VIPER.

* cited by examiner

*Primary Examiner* — Ching Chang
(74) *Attorney, Agent, or Firm* — Julia Voutyras; Brooks Kushman P.C.

(57) ABSTRACT

An internal combustion engine having two cylinder banks and adjustable camshaft timing is disclosed in which the camshafts in one cylinder bank are adjusted so that there is no net flow from the cylinders to effectively disable the cylinder bank. In particular, exhaust valve timing is advanced so that the maximum valve lift occurs approximately at bottom center between expansion and exhaust strokes and intake valve timing is advanced so that maximum valve lift occurs approximately at bottom center between intake and compression strokes. Also disclosed is an engine in which an intake and an exhaust camshaft on a single bank are coaxial with valve timings adjusted by rotating the inner of the two camshafts with respect to the outer of the two camshafts.

20 Claims, 14 Drawing Sheets

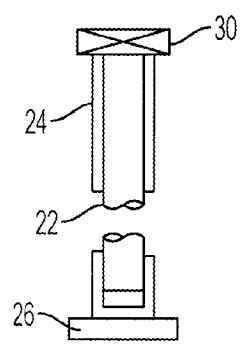
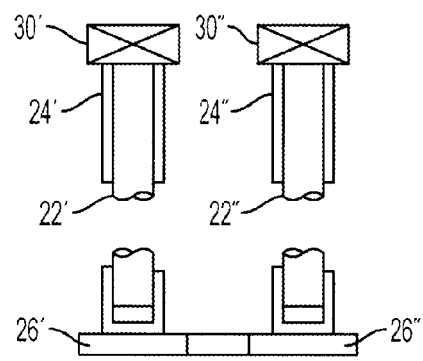
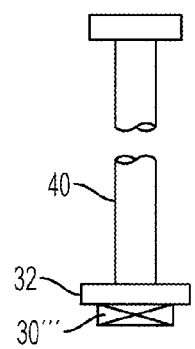
FIG. 1A          FIG. 2A          FIG. 3A
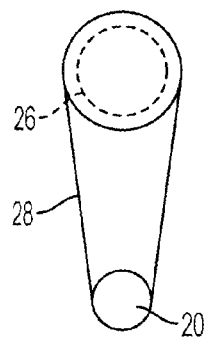
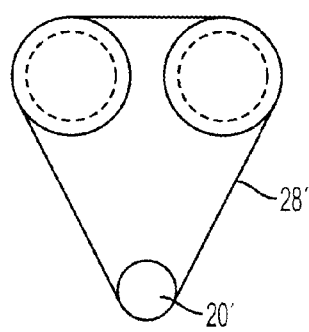
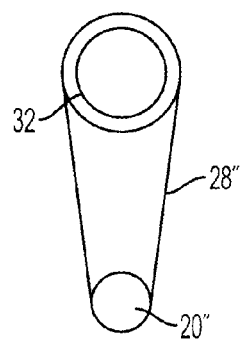
FIG. 1B          FIG. 2B          FIG. 3B

FIG. 22A EXPANSION
FIG. 22B EXHAUST
FIG. 22C INTAKE
FIG. 22D COMPRESSION

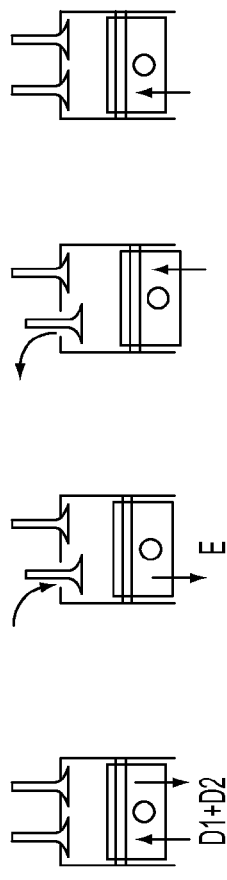
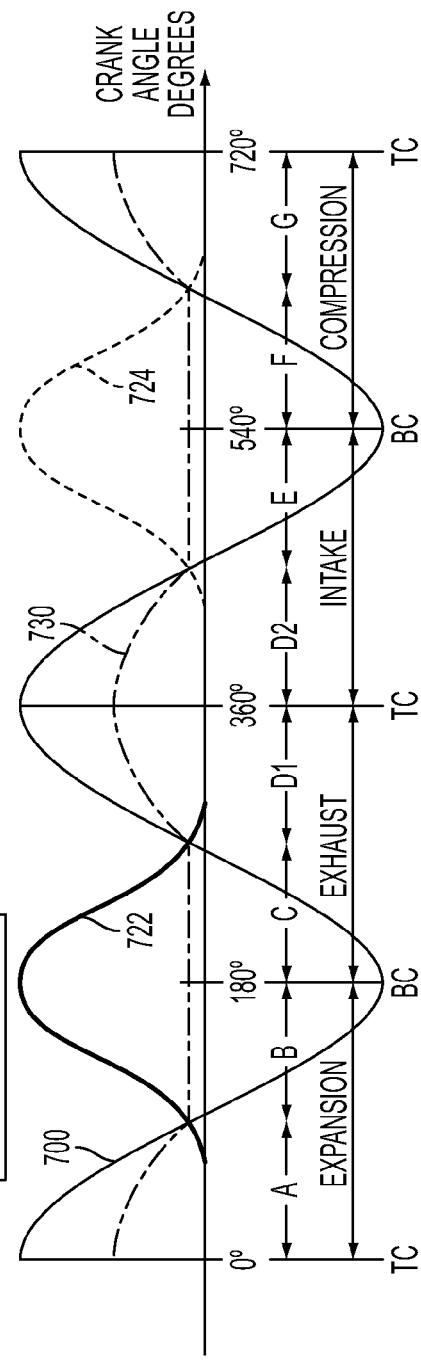
FIG. 23A   FIG. 23B   FIG. 23C   FIG. 23D   FIG. 23E   FIG. 23F   FIG. 23G
FIG. 23

ADJUSTING VALVE TIMING TO DEACTIVATE ENGINE CYLINDERS FOR VARIABLE DISPLACEMENT OPERATION

CROSS-REFERENCE TO RELATED APPLICATION

This application is a continuation-in-part of commonly owned and copending U.S. application Ser. No. 12/351,049, which is hereby incorporated by reference in its entirety.

BACKGROUND

1. Technical Field

The present disclosure relates to using a variable camshaft timing device to deactivate a portion of engine cylinders.

2. Background Art

Variable camshaft timing (VCT) devices are used to change the phase relationship between the crankshaft and the camshaft lobes that control actuation of the intake and exhaust poppet valves. By controlling the phase relationship, the fuel economy, performance, and emissions can be improved by providing less valve overlap at low engine speed operation to improve combustion stability, and more valve overlap at higher engine speed to improve engine power and performance.

It is known that by deactivating a portion of engine cylinders when the engine is operating at light load, that overall fuel economy can be improved. Typically, cylinders are deactivated by deactivating intake and exhaust poppet valves. In U.S. Pat. No. 6,237,559 B1, commonly assigned to the assignee of the present application, cylinder deactivation is provided by disabling exhaust poppet valves. The intake valves are not disabled, but are opened and closed generally symmetrically about a top center or bottom center position of the piston. This results in a cost savings because valve deactivators are provided for exhaust valves and not intake valves. However, such a system does not eliminate valve deactivators, which are known to be problematic. For example, there are typically issues associated with latching the valve deactivators and difficulties in ensuring that they are latched within one engine cycle, particularly at high engine speeds.

In U.S. Pat. No. 5,642,703 commonly assigned to the assignee of the present application, cylinder deactivation is provided by adjusting a single camshaft which actuates both the intake and the exhaust valves, or alternatively, using dual camshafts. However, this reference teaches that both camshafts may be linked together with one phase and that adjusting the timing of the valve lift events has no effect on the relative timing between the exhaust valve lift event and intake valve lift event, i.e., the timing between exhaust and intake valve lift events remains constant regardless of phase shifting. Because the intakes and exhausts are not independently adjusted, one embodiment shows both valve events retarded such that the exhaust valve event is roughly centered about top center (TC) of piston movement between the exhaust and intake strokes and the intake valve event is roughly centered about bottom center (BC) between the intake and compression strokes. The valve events are optimized for normal operation, not for deactivated operation. Thus, it is not possible to adjust both intake and exhaust valve events such that they are symmetrical about a rotational position of the crankshaft when the direction of the piston changes, i.e., TC or BC. Also, valve overlap, which lasts about 25 degrees of crank rotation is not adjusted in such a system because the intake and exhaust valve events move in lock step. It is typical for the intake system to operate at a vacuum and the exhaust system to be at a pressure slightly higher than atmospheric. Thus, during the valve overlap period while the valves are in the deactivated condition, exhaust gases flow into the intake and are then inducted by the activated cylinders. While there may be operating conditions where such flow from exhaust to intake is advantageous, it is desirable to control such flow. For example, when operating at low torque conditions, there is a considerable intake manifold vacuum to drive flow from the exhaust to the intake. However, this is an operating condition where no additional exhaust gases can be accommodated without impairing combustion stability. At higher torque conditions, exhaust gases can be accommodated in the combustion charge, but there is little manifold vacuum to drive the flow from exhaust to intake. While the strategy for valve deactivation disclosed in U.S. Pat. No. 5,642,703 is suitable for many applications, various advantages may be provided by appropriate control of valve overlap that cannot be achieved with such a strategy.

SUMMARY

According to an embodiment of the present disclosure, a portion of cylinders are deactivated by opening and closing exhaust valves generally symmetrically about a bottom center position of the piston and opening and closing intake valves generally symmetrically about a bottom center position of the piston with the intake and exhaust camshafts adjusted by a mechanical adjustment device to provide substantially no valve overlap. By opening and closing the intake or exhaust valves in such a manner, the gases inducted into engine cylinders while the piston is moving toward bottom center are exhausted from engine cylinders while the piston is moving upward from bottom center. By causing the valve event to be generally symmetrical about bottom center, the quantity of gases entering and exiting the cylinder is substantially equal. Thus, there is substantially no net flow of gases.

Valve deactivation according to the present disclosure presents an advantage by using exhaust cam phasing to effectively disable the cylinder as opposed to the solution shown in U.S. Pat. No. 6,237,599 in which exhaust valve deactivators are employed. As typical of hydraulic variable cam timing devices, the VCT device in '599 has insufficient range of authority to adjust exhaust valve timing to provide substantially no valve overlap and relies on valve deactivators on the exhaust valves. The valve deactivation strategy of the present disclosure also presents an advantage over strategies such as shown in U.S. Pat. No. 5,642,703 because adjusting the exhaust and intake valve events independently allows operation with substantially no valve overlap. Thus, unintended exhaust flow into the intake is substantially eliminated.

Use of a mechanical cam phasing device, such as disclosed herein, provides a greater range of authority, thereby facilitating adjusting the exhaust camshaft to a position in which there is substantially no net flow of gases through the exhaust valves. Such camshaft phasing device acts upon each camshaft as a whole. Thus, in an engine having two cylinder banks, one bank of cylinders may be operated with conventional valve timings, whereas, the valve timings of the other bank of cylinders are adjusted to deactivate the cylinders.

In deactivator systems in which valve deactivators are provided to cause the valves to stay closed, the gases trapped in the cylinder are compressed and expanded during each engine revolution. After several revolutions, the average pressure in the cylinder is approximately atmospheric with pressures exceeding atmospheric when the piston is near top center and pressures below atmospheric when the piston is near bottom center. During periods of vacuum in the cylinder, oil from the cylinder walls is drawn past the piston ring(s) and into the combustion chamber. When such cylinders are reactivated, the excess oil is burned, which is generally undesirable. Thus, it is desirable to avoid such a vacuum existing in the cylinder. According to an aspect of the present disclosure, by having an exhaust valve or an intake valve open during the period when the piston is near bottom center, vacuum that would otherwise develop in the cylinder cannot develop. Instead, according to an embodiment of the present disclosure, the pressure in the cylinder is substantially the same as that in the exhaust manifold when the exhaust valve opens and substantially the same as the pressure in the intake manifold when the intake valve opens thereby relieving any vacuum that would otherwise build up due to piston movement. Because substantially no vacuum develops in the cylinders, oil pumping past piston rings is mitigated according to an embodiment of the present disclosure.

Furthermore, most valve deactivation systems deactivate (or activate) valves in an abrupt manner causing one-half of engine cylinders to turn off (or turn on) abruptly. It is difficult to manage engine torque to obtain a smooth transition under such conditions. Yet another advantage of an embodiment of the present disclosure is that the valve adjustments to the symmetric valve timing can be accomplished over a number of engine cycles to facilitate a smooth transition in torque.

BRIEF DESCRIPTION OF THE DRAWINGS

FIGS. 1A and 1B illustrate a representative arrangement of a device having coaxial camshafts with one cam axis per cylinder head for changing phase relationship between the inner and outer camshafts to provide selective cylinder deactivation or variable displacement operation according to embodiments of the present disclosure;

FIGS. 2A and 2B illustrate a representative arrangement of a device having coaxial camshafts with two cam axes per cylinder head for changing phase relationship between two or more rotating shafts to provide selective cylinder deactivation according to embodiments of the present disclosure;

FIGS. 3A and 3B illustrate a representative arrangement of a device for changing phase relationship between a conventional camshaft and crankshaft according to embodiments of the present disclosure;

FIGS. 22A-D show valve positions at selected locations on FIG. 22;

FIG. 23 is a graph showing piston position and valve lift during 720 degree of crankshaft rotation for a valve timing to selectively deactivate cylinders according to and embodiment of the present disclosure;

FIGS. 23A-G show valve positions at selected locations on FIG. 23; and

DETAILED DESCRIPTION

Figure 4:
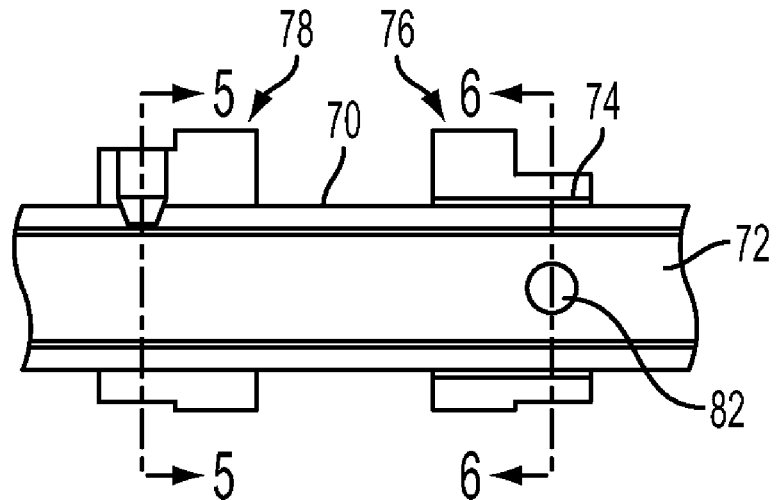
FIG. 4 is a top cross-sectional view of a representative coaxial camshaft for use with a device for changing phase relationship according to embodiments of the present disclosure.

As those of ordinary skill in the art will understand, various features of the embodiments illustrated and described with reference to any one of the Figures may be combined with features illustrated in one or more other Figures to produce embodiments that are not explicitly illustrated or described. The combinations of features illustrated provide representative embodiments for typical applications. However, various combinations and modifications of the features consistent with the teachings of the present disclosure may be desired for particular applications or implementations. The representative embodiments used in the illustrations relate generally to a multi-cylinder, internal combustion engine having a non-hydraulic variable cam timing device to vary the angular relationship between the camshaft and crankshaft and/or between sets of camshaft lobes to provide variable displacement operation by selectively deactivating cylinders by adjusting valve timing. However, those of ordinary skill in the art may recognize similar applications or implementations with other engine/vehicle technologies.

FIGS. 1-3 illustrate representative arrangements for controlling the rotational phase relationship between two or more rotating shafts of an internal combustion engine using a device or devices according to the present disclosure. Those of ordinary skill in the art will recognize that although the representative examples of FIGS. 1-3 illustrate a device according to the present disclosure used to change the relationship between two camshafts and/or between a camshaft and a crankshaft to selectively deactivate one or more cylinders or a bank of cylinders, other suitable applications for such a device exist. Likewise, a mechanical phaser according to the present disclosure is not limited to the illustrated arrangements and one or more such devices may be used depending upon the particular application and implementation. In the representative arrangements illustrated, the function or role of any particular camshaft may vary by application and implementation to operate intake valves, exhaust valves, or both.

In the arrangement represented by the top view of FIG. 1A and the front view of FIG. 1B, an engine having a single cam axis for each cylinder head includes a coaxial camshaft having an inner exhaust camshaft 22 for operating exhaust valves and an outer intake camshaft 24 for operating intake valves, or vice versa. As such, an in-line or I-type cylinder configuration would include a single crankshaft 20 and coaxial camshaft 22, 24 whereas a V-type configuration would include two cylinder heads each having a coaxial camshaft 22, 24 connected to a single crankshaft 20. In either arrangement, outer camshaft 24 may be driven by a drive sprocket 26 connected by a chain or belt 28 to crankshaft 20. Alternatively, outer camshaft 24 may be driven by a hydraulic phaser (not shown) to selectively change the phase relationship between crankshaft 20 and outer camshaft 24, although use of a hydraulic phaser in combination with a mechanical phaser according to the present disclosure may not achieve all of the advantages of exclusive use of mechanical phasers, such as cold temperature performance, lower oil pressure operation, range of control to provide substantially no valve overlap, etc. A mechanical phaser 30, as described in greater detail herein, drives inner camshaft 22 using first and second oppositely biased worm assemblies to selectively change the phase relationship between outer camshaft 24 and inner camshaft 22.

The representative arrangement illustrated in FIG. 2 represents a dual overhead camshaft arrangement with two cam axes per cylinder head. A first cam axis is associated with first inner camshaft 22' and first outer camshaft 24' that both operate intake valves with at least two intake valves per cylinder. A second cam axis is associated with second inner camshaft 22" and second outer camshaft 24" that both operate exhaust valves with at least two exhaust valves per cylinder. Outer camshafts 24', 24" may be driven directly from chain 28' or indirectly through conventional hydraulic phasers (not shown) positioned at the front of each coaxial camshaft. Mechanical phasers 30', 30" control timing of the valves operated by cam lobes on corresponding inner camshafts 22', 22". Appropriate staggered or offset control of the valve opening timing of the two valves provides a longer overall duration of the opening event.

A mechanical phaser according to the present disclosure has no inherent limits to its range of control as compared to hydraulic phasers that are typically limited to around thirty degrees of total motion at the camshaft (or sixty degrees as measured by crankshaft rotation). As described in greater detail herein, this range of control facilitates generally symmetric valve timing relative to cylinder bottom dead center to provide substantially no overlap during cylinder deactivation for variable displacement engine applications. Hydraulic phaser arrangements may be used to implement dual dependent variable cam timing with a first drive chain coupled to the crankshaft to drive one of the camshafts through a first phaser and a second drive chain running between the dual camshafts to drive the other camshaft through a second phaser. This provides the second camshaft a greater total range of adjustment relative to the crankshaft than what could be achieved with a dual independent configuration using conventional hydraulic phasers. The mechanical phasers of the present disclosure may be used to implement dual independent variable cam timing with the phaser of each camshaft receiving its input from the drive chain coupled to the crankshaft. This mechanical dual independent configuration has a larger range of authority over the second camshaft timing than does the hydraulic dual dependent arrangement, but does not force one of the phasers to carry the loads of both camshafts.

In the representative arrangement of FIG. 3, crankshaft 20" drives sprocket 32, which is coupled to a conventional one-piece camshaft 40 via mechanical phaser 30'". As best illustrated in the cross-section of FIG. 14, drive sprocket 32 is located near the front bearing and the radial chain load from chain 28" is supported by camshaft 40 and associated bearings that carry the cantilevered load out past the front bearing. This arrangement uses mechanical phaser 30'" to selectively change the phase relationship between rotating crankshaft 20" and camshaft 40.

Figure 5:
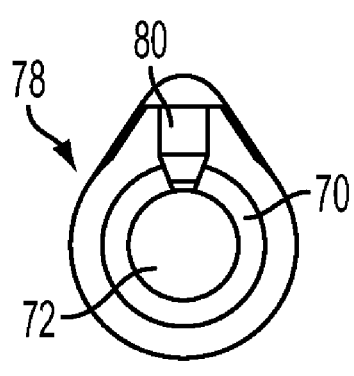
FIG. 5 is a cross-section along line 5-5 of the coaxial camshaft of FIG. 4 illustrating a fixed cam lobe.
Figure 6:
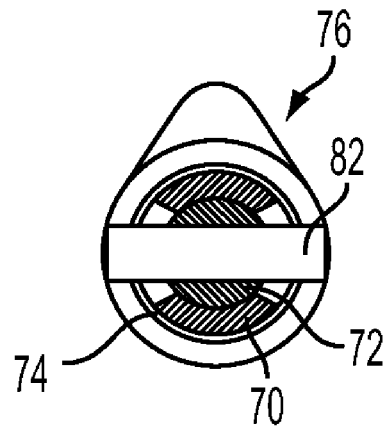
FIG. 6 is a cross-section along line 6-6 of the coaxial camshaft of FIG. 4 illustrating a variable cam lobe.
Figure 7:
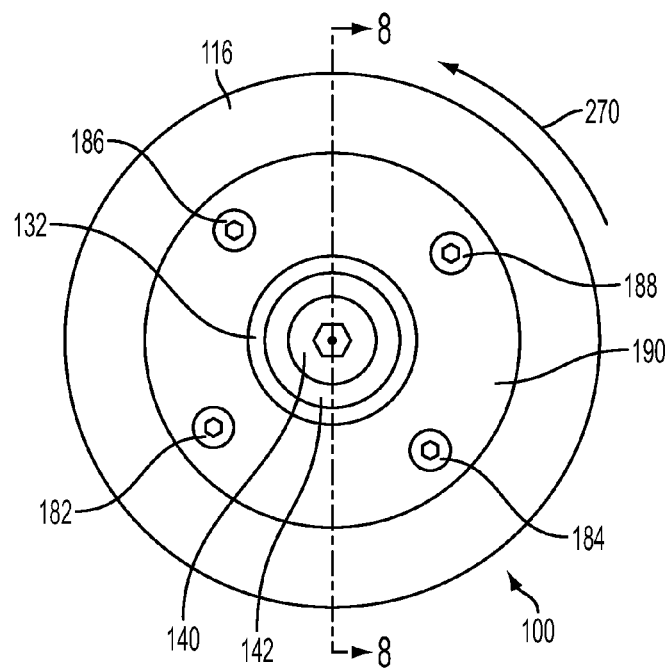
FIG. 7 is an end view of one embodiment of a device for changing phase relationship according to the present disclosure.

FIGS. 4-6 illustrate a representative coaxial camshaft for use with a device for changing phase relationship between first and second rotating shafts according to the present disclosure. In this arrangement, outer camshaft 70 carries adjustable cam lobe 76 (best shown in FIG. 6) and fixed cam lobe 78 (best shown in FIG. 5) on one diameter to ensure concentricity and carries associated radial loads of valve actuation. Inner camshaft 72 carries minimal or no bending load from the valve opening forces, but provides the torque needed to drive adjustable cam lobes 76. Inner camshaft 72 is supported on two bushings (not shown) at either end. Fixed cam lobes 78 are rigidly connected to outer camshaft 70 with set screw 80, or camshaft 70 may be swaged into the fixed cam lobes or attached by other means. Adjustable cam lobes 76 are free to rotate on outer camshaft 70 via a bushing 74 within their inner diameter. Adjustable cam lobes 76 are driven by inner camshaft 72 via dowel pin 82 that connects through slots in outer shaft 70. During operation, a variable cam timing device as illustrated and described herein may be used to change the phase relationship between outer camshaft 70 and inner camshaft 72 to effect symmetric valve timing with substantially no valve overlap for cylinder deactivation during variable displacement operation.

FIGS. 7-12 illustrate one embodiment of a device for selectively varying a relative angular position between first and second rotating shafts of an internal combustion engine according to the present disclosure. Device 100 includes a first worm assembly 102 coupled to first rotating shaft 110 via worm carrier 160 and second rotating shaft 112 via gear 132, and torsionally preloaded to provide a first torque tending to advance the relative angular position of the second shaft relative to the first shaft, and a second worm assembly 104 coupled to the first and second rotating shafts 110, 112 and torsionally preloaded opposite to the first assembly 102 to provide a second torque simultaneously tending to retard the relative angular position of the second shaft 112 relative to the first shaft 110 such that backlash and torsional free play between the two shafts is removed and the relative angular position of the first and second shafts remains substantially constant during rotation of the shafts whenever their angular phase relationship is not being adjusted. At least one actuator acts on rear side gear 116 and front side gear 118 and selectively applies an actuating torque to respective worm pinions 120, 122 of the first and second worm assemblies 102, 104 to rotate the second shaft 112 relative to the first shaft 110 and change the relative angular position between the first and second shafts 110, 112.

In one embodiment, device 100 is fitted to the rear of a coaxial camshaft having an outer camshaft 110 and inner camshaft 112. A front side plate 130 is electron beam welded onto the rear end of outer camshaft 110. A worm gear 132 is welded onto a tube 134 disposed within outer camshaft 110 with a running fit, and is pressed tightly onto a reduced diameter section 136 toward the rear end of inner camshaft 112. A screw 140 engages corresponding threads (not shown) within inner camshaft 112 and clamps washer 142 and tube 134 against the shoulder formed by reduced diameter portion 136 of inner camshaft 112. Additional torque carrying capacity may be provided by a splined interface or by a pin (not shown) passing through tube 134 and inner camshaft 112. Depending on the particular application and implementation, a common pin could be used to attach a cam lobe 76 and tube 134 to inner camshaft 112.

Figure 8:
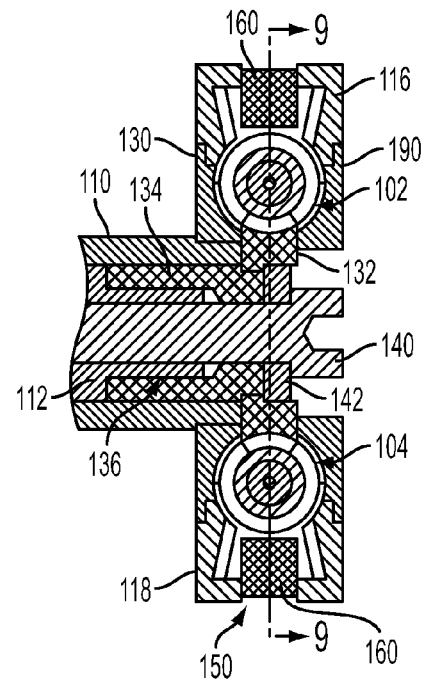
FIG. 8 is a cross-section along line 8-8 of the embodiment of FIG. 7.
Figure 9:
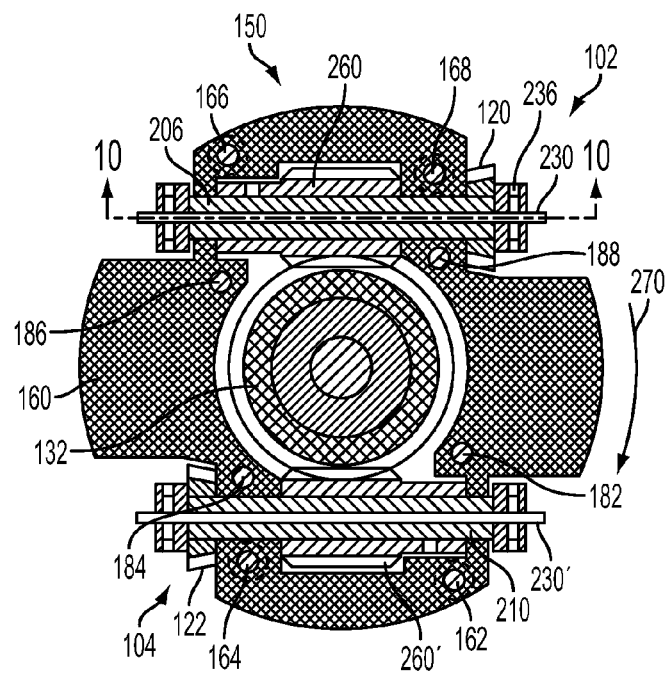
FIG. 9 is a cross-section along line 9-9 of the cross-section of FIG. 8.
Figure 10:
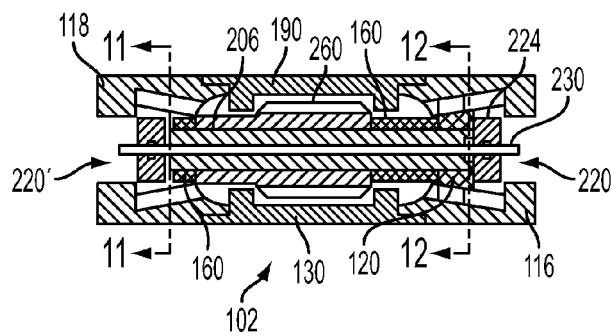
FIG. 10 is a cross-section along line 10-10 of the cross-section of FIG. 9.
Figure 11:
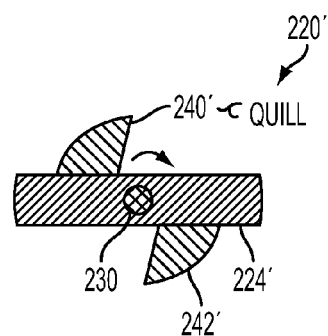
FIG. 11 is a cross-section along line 11-11 of the cross-section illustrated in FIG. 10.
Figure 12:
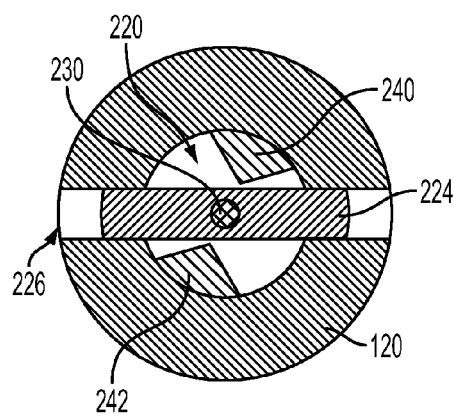
FIG. 12 is a cross-section along line 12-12 of the cross-section illustrated in FIG. 10.

As best illustrated in the cross-sections of FIGS. 8-9, a worm carrier assembly 150 contains first and second worm assemblies 102, 104. Carrier assembly 150 includes carrier 160 that is assembled around worm gear 132 which is attached to inner camshaft 112 through tube 134. Four flat head screws or rivets 162, 164, 166, 168 hold the two halves of carrier 160 together to contain the worm assemblies 102, 104. Four additional flat head screws or rivets 182, 184, 186, 188 pass through rear side plate 190, through carrier 160, and into front side plate 130, attaching the carrier assembly 150 to outer camshaft 110 via the electron beam weld previously described. The actuator, which in this embodiment includes front side gear 118 and rear side gear 116, includes teeth in meshing engagement with worm pinions 120, 122 and are captured between carrier 160 and front side plate 130 and rear side plate 190, respectively, in a manner that constrains fore/aft, and radial motion of side gears 116, 118, but allows each side gear 116, 118 to rotate about the axis of camshafts 110, 112, while transferring torque to/from worm pinions 120, 122. The meshing engagement between side gears 116, 118 and worm pinions 120, 122 is best illustrated in the cross-section of FIG. 10.

In the embodiment shown in FIGS. 7-12, the axes of worm pinions 120, 122 and the common axis of side gears 116, 118 do not intersect with one another. As such, worm pinion gears 120, 122 and the mating side gears 116, 118 are constructed with a hypoid design, similar to the gears used in the rear axle of many rear wheel drive vehicles with front mounted engines. Worm pinions 120, 122 have a running fit to respective worm shafts 206, 210 and transmit torque to a quill clamp 220 that has a blade 224 engaged into a slot 226 on the end of pinion gear 120 as best illustrated in the cross-sections of FIGS. 10-12. This quill clamp 220, in turn, transmits torque to a torsion element implemented by a quill 230 in this embodiment. Quill 230 passes through the length of worm shaft 206, and the torque is received by another quill clamp 220' at the opposite end of worm shaft 206. Each quill clamp is attached to quill 230 by a pair of set screws 236. A torsional preload can be imparted to quill 230 by twisting and holding the ends of the quill that extend beyond clamps 220 and 220' while the set screws are being tightened. This second quill clamp 220' also has a blade 224' that transmits the torque to drive lugs 240', 242' on the corresponding end of worm shaft 206. When quill 230 reaches a certain level of torsional load, elastic deformation of quill 230 allows quill clamp 220 to rotate relative to worm shaft 206 so that blade 224 contacts drive lugs 240, 242 of worm shaft 206 at the pinion end and any increased level of torque is transmitted from pinion gear 120 to worm shaft 206, at that contact, without further deformation of quill 230. A worm 260 is secured to worm shaft 206 so that rotation of worm shaft 206 produces rotation of worm 260, and consequent rotation of worm gear 132 such that inner camshaft 112 rotates relative to worm carrier assembly 150 and outer camshaft 110.

In operation, an actuator under control of an engine control module to deactivate an associated group of cylinders applies a frictional dragging force on front side gear 118 causing it to rotate backward relative to outer camshaft 110 and worm carrier assembly 150. The relative motion causes worm pinions 120, 122 to rotate respective worms 260, 260' in a clockwise direction as viewed from the worm pinion gear end of each worm assembly. Because worms 260, 260' both have their teeth oriented in right hand helices, clockwise rotation of worms 260, 260' will cause inner camshaft 112 to advance or move in the direction of rotation indicated by arrows 270 relative to outer camshaft 110. Similarly, when an actuator under control of the engine control module applies a frictional dragging force to rear side gear 116 causing rear side gear 116 to rotate backward relative to outer camshaft 110 and worm carrier assembly 150, the relative motion causes counterclockwise rotation of worms 260, 260' to retard inner camshaft 112 relative to outer camshaft 110.

During operation of the engine, as the outer camshaft 110 and inner camshaft 112 rotate to actuate valves coupled by cam followers and corresponding cam lobes, the action of the cam lobes on the followers produces an oscillating torsional load between outer camshaft 110 and inner camshaft 112. As such, it is desirable to reduce or eliminate backlash within the device to prevent noise and wear and to maintain a desired phase relationship between the rotating shafts when no actuating torque is applied to rear side gear 116 or front side gear 118. According to one aspect of the present disclosure, this is accomplished by having opposite hand torsional preload on the two worm assemblies 102, 104. When the variable cam timing device is rotating at a steady-state without advancing or retarding, worm assembly 102 is torsionally preloaded or biased in a direction attempting to advance inner camshaft 112, while worm assembly 104 has an opposite preload or bias that attempts to retard inner camshaft 112. Because worms 260, 260' have a relatively fine tooth pitch, a torque applied to the worms can produce rotation of worm gear 132. However, the converse does not produce movement, i.e. because of the friction locking between worm gear 132 and worms 260, 260', a torque applied to worm gear 132 will not produce rotation of worms 260, 260', as long as the worms have any amount of resisting torque. The torsional preloads between worm pinion gears 120, 122 and the associated worm shafts 206, 210 are transmitted through the corresponding quills 230, 230', respectively. In the steady state condition, worm assembly 102 has a clockwise preload on its quill 230, and worm assembly 104 has a counterclockwise preload on its quill 230'.

Figure 13:
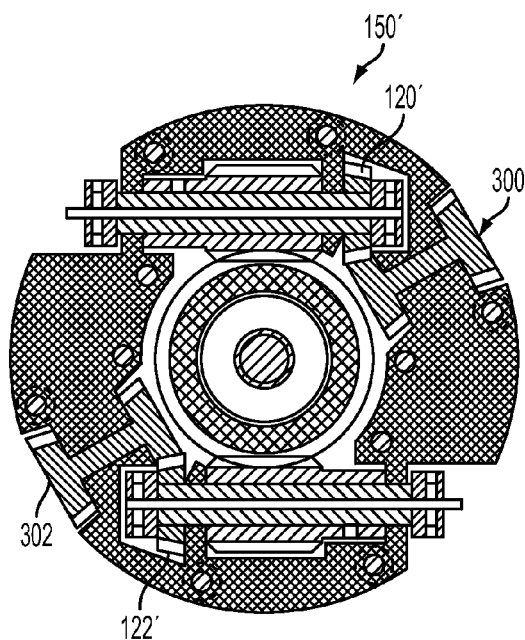
FIG. 13 is a cross-section illustrating an alternative embodiment having bevel gears in place of hypoid gears.

FIG. 13 illustrates an alternative embodiment of a carrier assembly 150' having intermediate gear assemblies 300, 302, with one end in meshing engagement with a corresponding worm pinion gear 120', 122', respectively, and an opposite end in meshing engagement with the actuating gear(s) implemented by a front side gear and rear side gear as described with respect to the embodiment illustrated in FIGS. 7-12. Intermediate gear assemblies 300, 302 are positioned with axes intersecting the axes of corresponding pinion gears 120' and 122', and also the common axis of the front and rear side actuating gears such that bevel gears may be used rather than hypoid gears.

Figure 14:
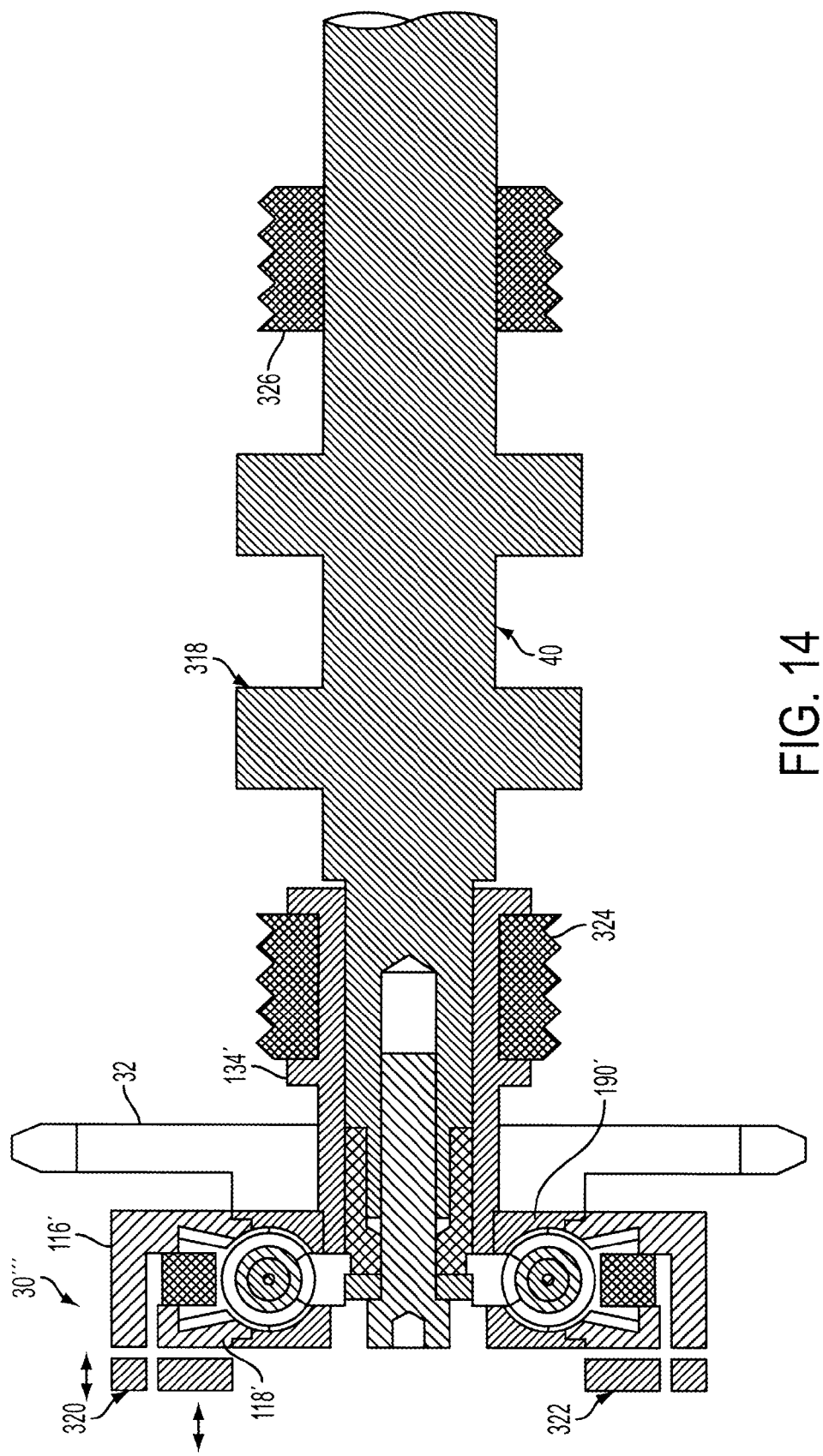
FIG. 14 is a cross-section illustrating an arrangement using one embodiment of a device operating as a primary phaser on a conventional camshaft to selectively change the phase relationship between the crankshaft and camshaft according to the present disclosure.

FIG. 14 is a cross-sectional view of a mechanical phaser 30''' used with a conventional camshaft 40 such as illustrated in the diagram of FIG. 3. Camshaft 40 includes cam lobes 318 to operate corresponding intake/exhaust valves and phaser 30'' may be constructed with no mechanical limits on its range of phase adjustment relative to camshaft drive sprocket 32. Camshaft drive sprocket 32 may be attached in any suitable manner to rear side plate 190', or may be integrally formed therewith. Outer stub shaft 134' is secured to rear side plate 190' and rotates with sprocket 32, which is located near front bearing 324. The radial chain load applied through sprocket 32 is supported by camshaft 40, which is in turn supported by front bearing 324 as well as by various other bearings, such as second camshaft bearing 326 to carry the cantilevered load of the mechanical phaser and sprocket assembly out past front bearing 324. During operation, a first axial actuator 320 selectively applies a frictional dragging torque to rear side gear 116' to retard the rotation of camshaft 40 relative to sprocket 32 and crankshaft 20'' (FIG. 3) as previously described with reference to the embodiment of FIGS. 7-13. Similarly, to advance rotation of camshaft 40 relative to sprocket 32 and crankshaft 20'' (FIG. 3), a second axial actuator 322 selectively applies a frictional dragging torque to front side gear 118'. First and second actuators or brakes 320, 322 may be mounted to the engine front cover or other stationary component depending on the particular application and implementation.

Figure 15:
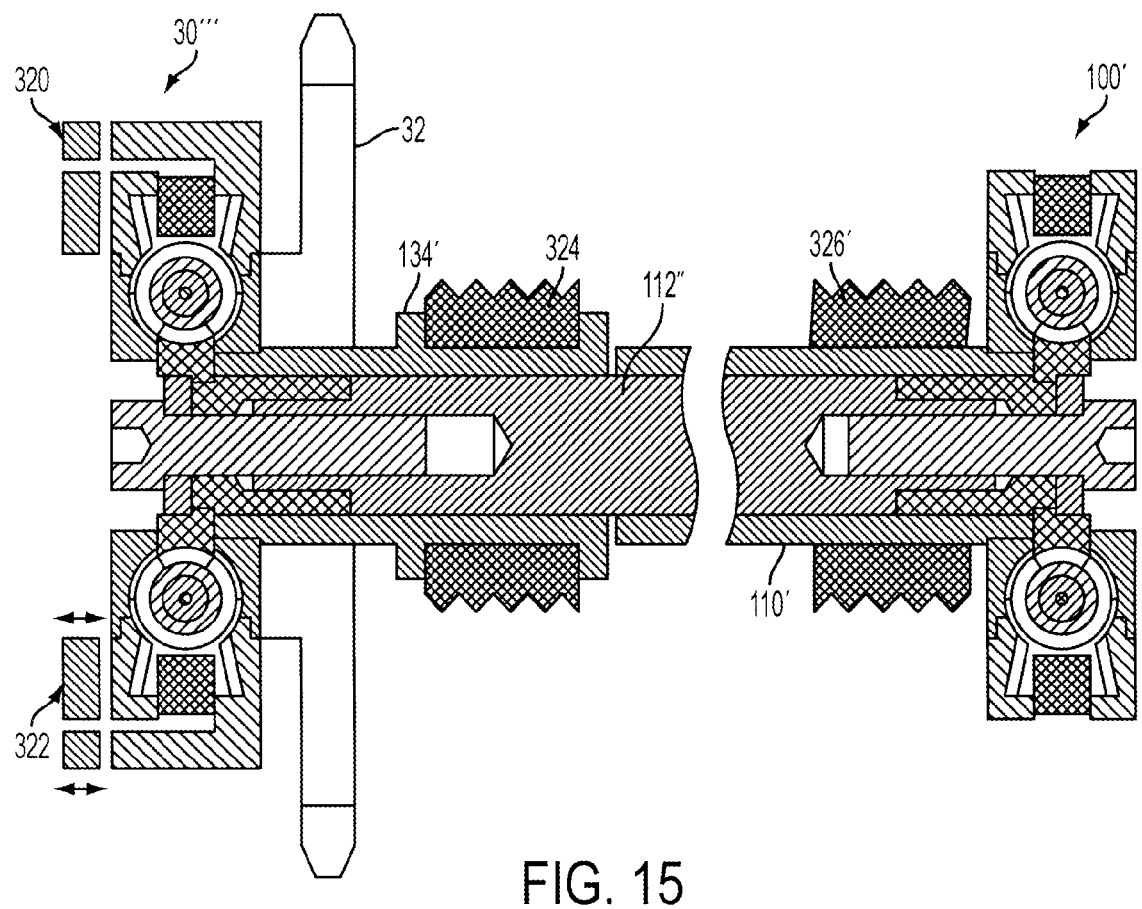
FIG. 15 is a cross-section illustrating an arrangement having two devices for changing phase relationship between coaxial camshafts and a crankshaft according to the present disclosure.

FIG. 15 is a cross-sectional view of another arrangement for selectively changing the phase relationship between two or more rotating shafts of an internal combustion engine according to the present disclosure. In the arrangement of FIG. 15, a first (front) device 30''' controls the phase relationship of inner coaxial camshaft 112' relative to drive sprocket 32 while a second (rear) device 100' controls the phase relationship of outer coaxial camshaft 110' relative to inner coaxial camshaft 112'. Similar to the arrangement illustrated in FIG. 14, the arrangement of FIG. 15 eliminates the use of any hydraulic phaser, which may facilitate use of a smaller oil pump and lower operating oil pressure, resulting in increased fuel efficiency.

Figure 16:
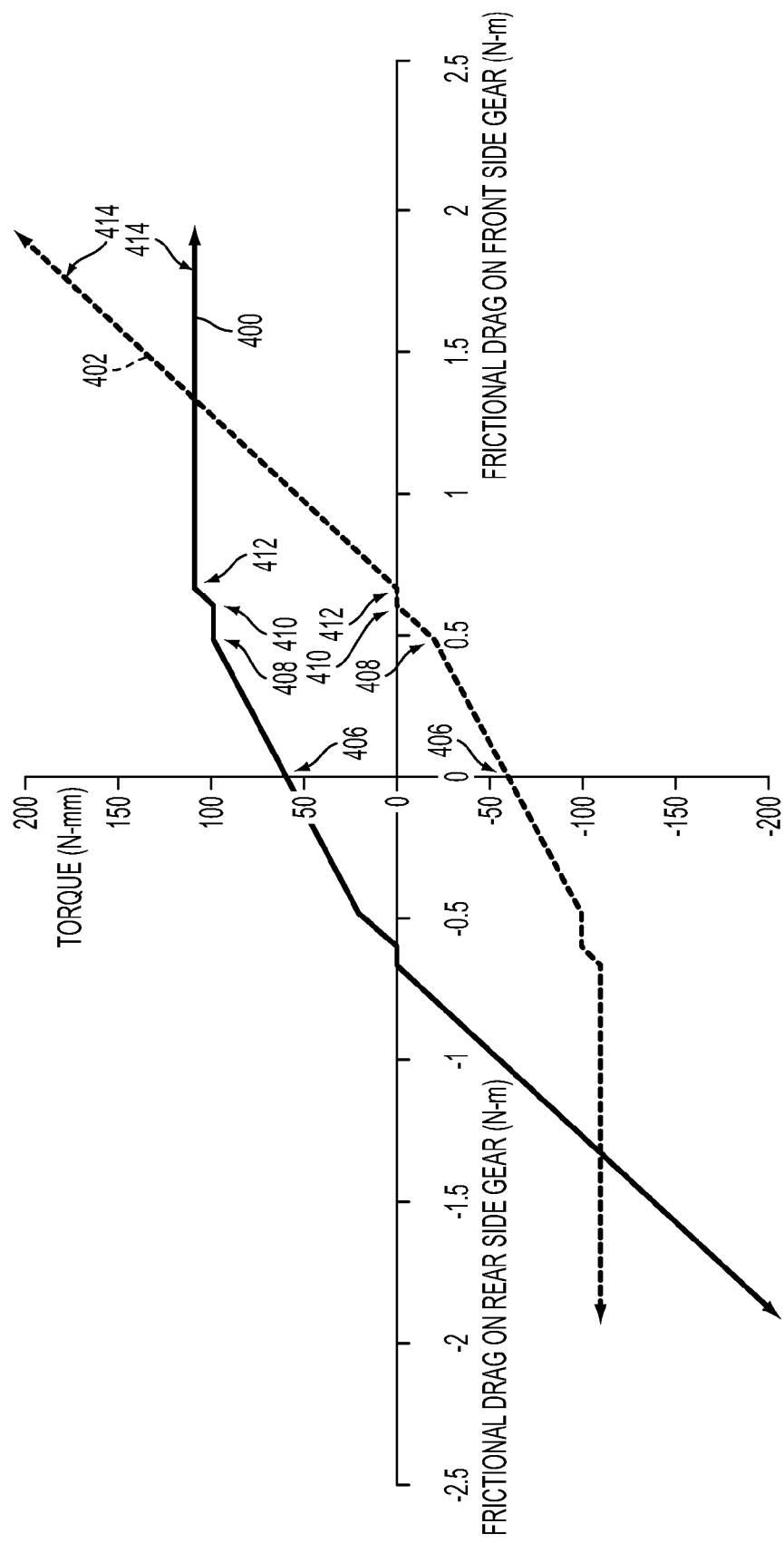
FIG. 16 is a graph illustrating the relationship between an actuating frictional load and torque applied to the first and second worm assemblies for a first torsional preload.
Figure 17:
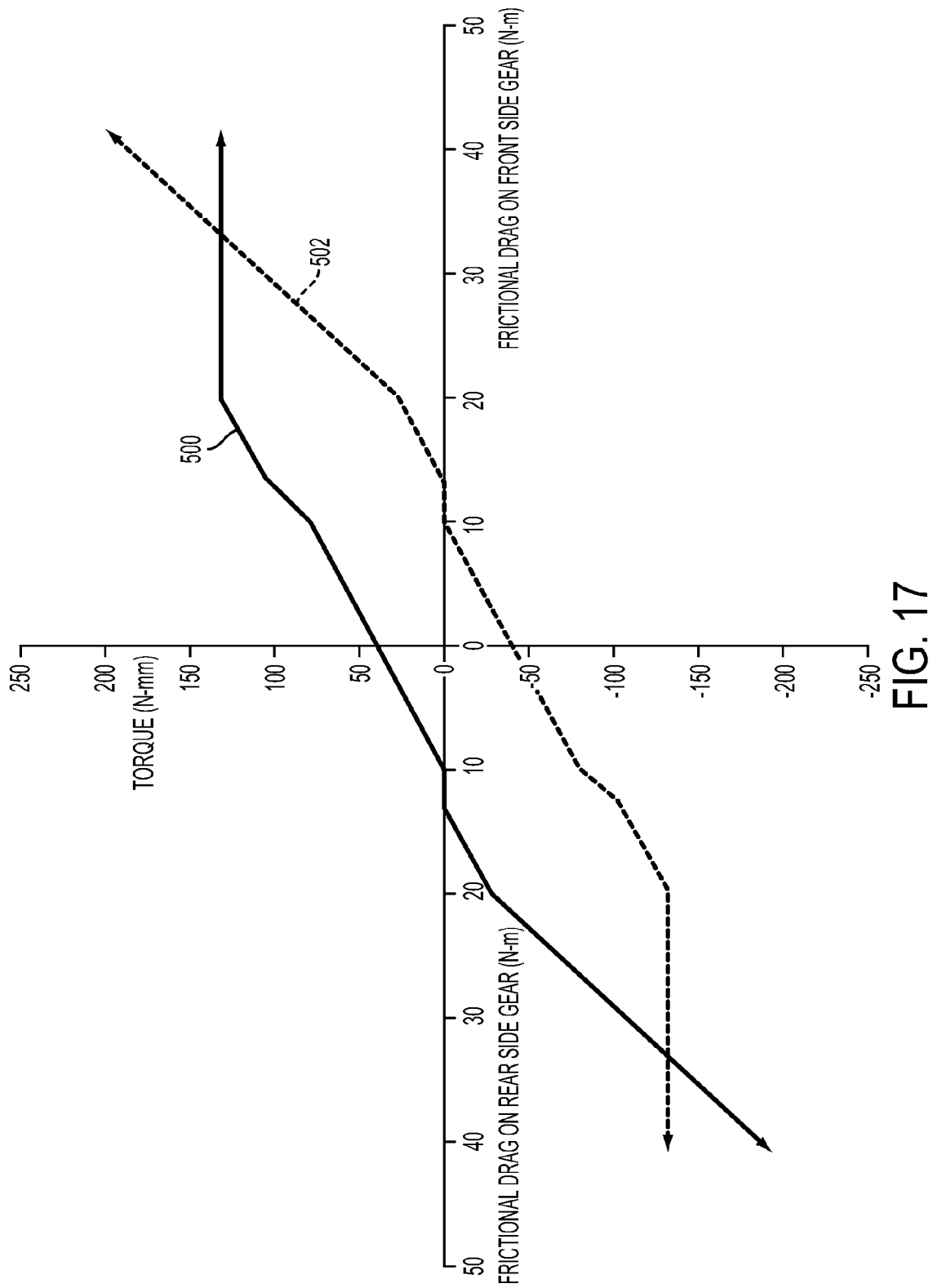
FIG. 17 is a graph illustrating the relationship between an actuating frictional load and torque applied to the first and second worm assemblies for a second torsional preload.

Referring now primarily to FIGS. 16-17, charts illustrating operation of a device for changing phase relationship between two rotating shafts of an internal combustion engine are shown. The charts of FIGS. 16-17 illustrate how an actuating torque provided by dragging forces applied on the front or rear side gears 116, 118 is translated into torque on the torsionally preloaded worm assemblies 102, 104 to rotate worm gear 132. The horizontal axes illustrate a representative actuating or frictional drag torque applied to the side gears to advance or retard the relative rotation of the rotating shafts. The vertical axes illustrate representative values for the resulting torque on the worm assemblies 102, 104 tending to advance or retard inner camshaft 112 relative to outer camshaft 110. At all values of drag torque applied to a side gear, the sum of the torques resulting in the two worm assemblies 102, 104 is equal to the torque applied to the side gear times the effective gear ratio between the side gear and the worm pinions. The amount of torque carried by one worm assembly as compared to the other worm assembly, however, changes because of differences in torsional preload torque, as well as changes in the elasticity within each worm assembly between the worm pinion and its worm.

In the embodiment illustrated in the chart of FIG. 16, the quill assemblies are preloaded so that the torsion element, implemented in the representative embodiment by quills 230, 230', will not be subjected to a reversal of torque direction. In contrast, for the embodiment illustrated in the chart of FIG. 17, the quill assemblies have a torsion element with a lower preload that subjects the torsion element to a reversal of torque direction.

In the chart of FIG. 16, line 400 represents the relationship between torque applied to worm assembly 102, and line 402 represents the relationship between torque applied to worm assembly 104 as a function of frictional drag torque applied to front side gear 118 or rear side gear 116. As illustrated in the charts of FIGS. 16-17, moving toward the right hand side of the chart represents an increasing frictional drag or actuating force on the front side gear 118, while moving toward the left represents an increasing frictional drag on the rear side gear 116. Moving upward represents the resulting torque on the worm assemblies attempting to advance inner camshaft 112, and moving downward represents torque that tries to retard inner camshaft 112. When neither side gear 116, 118 has a frictional drag or actuating force, the torque applied to the two worms 260, 260' through the preloaded quills 230, 230', respectively, balance each other. Worm assembly 102 is biased toward advancing worm gear 132, while worm assembly 104 is biased toward retarding worm gear 132. This neutral position is indicated at 406.

During actuation, when a frictional drag of up to 0.5 Newton-meters (N-m) is applied to front side gear 118 as indicated in the region between 406 and 408, the front side gear 118 and both worm pinion gears 120, 122 rotate relative to carrier 160. The quill 230 of worm assembly 102 sees an increasing clockwise torque, and quill 230' of worm assembly 104 sees a decreasing counterclockwise torque. Because both worm assemblies use quills of identical elasticity, the rate of torque increase in worm assembly 102 is equivalent to the rate of negative torque decrease in worm assembly 104. At the drag torque level indicated at 408, blade element 224 of the quill clamp 220 rotates to the point of contacting drive lugs 240, 242 of the worm shaft 206.

Once contact has been established between blade 224 and lugs 240, 242 of worm assembly 104, represented at 408, the torsional stiffness of the worm shaft 206 prevails over the elasticity of the quills. Additional dragging torque at the front side gear, represented by the transition from 408 to 410, is resisted by reduction of negative torque through the now stiff worm assembly 104. Rotation of the worm pinions is minimal and consequently the additional torque imposed upon worm assembly 102 is minimal.

As the frictional drag on the front side gear increases from 410 to 412, worm assembly 104 transitions from negative torque to positive torque, and the backlash in the gear meshes allows some rotation of the front side gear that does not impose any torque load through worm assembly 104. This small rotation of the front side gear, however, does cause an additional load to be imposed upon the quill 230 of worm assembly 102.

Up until this point, the dragging torque on the front side gear has not caused any rotation of the worms 260, 260', nor any change of the angular orientation between the outer camshaft 110 and the inner camshaft 112. However, any increase of dragging torque on the front side gear beyond 412 will impose an advancing torque on worm gear 132 from both of the worm assemblies 102, 104. With a substantial increase of dragging torque on the front side gear, represented on FIG. 16 by 414, worm assembly 104, driving through the stiff worm shaft 206, will generate substantial torque on its worm 260' while all of the torque on worm assembly 102 is passed through its elastic quill, and thus is limited to a lower maximum value. In effect, the stiffness of the worm shaft of worm assembly 104 allows generation of the "muscle" to advance the inner camshaft 112, while the elasticity of the quill 230 provides sufficient torque to keep its worm 260 out of the way.

During normal activation of the phaser, it is usually desired to have a rapid adjustment of the phase relationship between the outer and inner camshafts, 110 and 112 respectively. The dragging force applied to the front or rear side gears 130, 190 would be much larger than the range of loads shown on FIG. 16. The maximum loads may be determined by the durability strength of the phaser assembly 100 and would be controlled by limiting the frictional drag torques applied to the front and rear side gears 116, 118.

When both worm assemblies 102, 104 see a clockwise torque as generally indicated in area 414 of FIG. 16, an advancing torque is applied to worm gear 132. In some applications of phaser 100, the dynamic torque of the camshaft associated with operation of the intake and/or exhaust valves may be much higher than the torque applied to worm gear 132 by worm assemblies 102, 104, and inner camshaft 112 may be able to advance only during the portion of the dynamic torque load that is already trying to advance inner camshaft 112. At other moments, when the dynamic load of the cam action is trying to retard inner camshaft 112, worm assemblies 102, 104 may be unable to advance worm gear 132, but would have enough of a mechanical advantage or friction locking to hold it from retarding.

The left hand side of the chart in FIG. 16 represents an actuating force or frictional drag on rear side gear 116 and operates in a similar fashion as described above with the function/operation of worm assemblies 102, 104 reversed to retard inner camshaft 112.

The chart of FIG. 17 illustrates operation of an embodiment having a smaller torsional preload of quills 230, 230' than the embodiment illustrated in FIG. 16. Line 500 represents worm assembly torque as a function of actuating force for worm assembly 102, while line 502 represents worm assembly torque as a function of actuating force for worm assembly 104. With a smaller torsional preload, the torsion elements implemented by quills 230, 230' are subjected to a reversal in torque direction before the corresponding quill clamp blades 224 contact the worm shaft drive lugs 240, 242 at the pinion end of the worm shafts. Depending upon the particular application and implementation, the configuration illustrated in the chart of FIG. 17 may allow the device to be more responsive and provide faster advance and retard speeds than the embodiment illustrated in the chart of FIG. 16.

Figure 18:
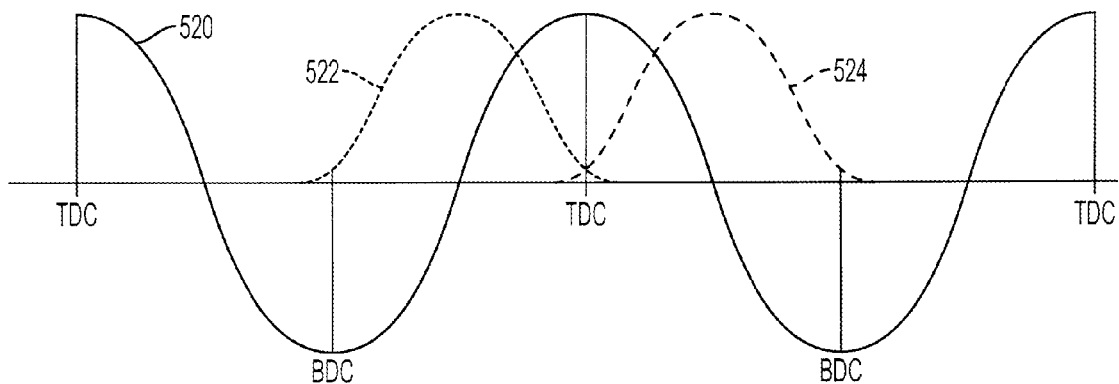
FIG. 18 is a plot illustrating operation of embodiments of a device for changing phase relationship between rotating shafts according to the present disclosure operated to provide conventional valve actuation.
Figure 19:
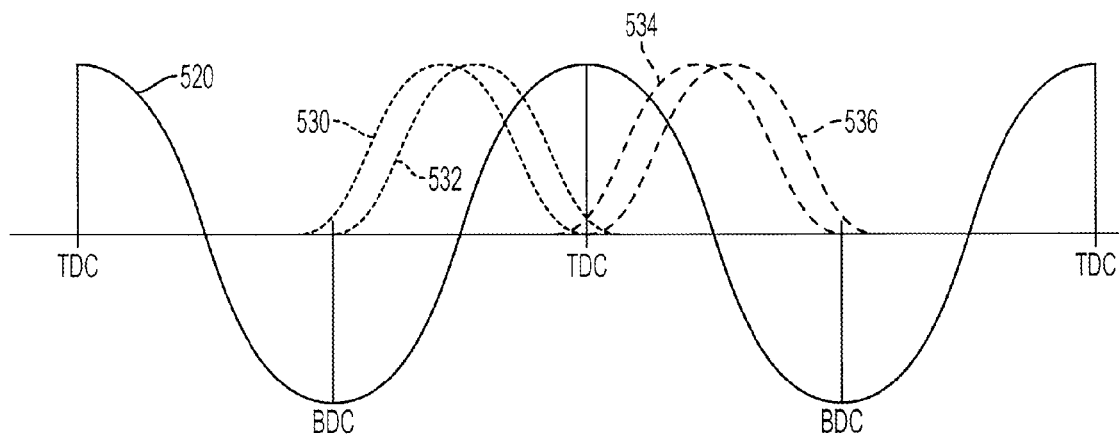
FIG. 19 is a plot illustrating offset opening and closing times of a pair of intake or exhaust valves to increase valve open duration using a device for changing phase relationship according to the present disclosure.

FIGS. 18-19 are plots illustrating gas exchange valve operation of a representative variable cam timing application using a device for selectively changing phase relationship between two or more rotating shafts with all cylinders activated according to the present disclosure. Line 520 represents piston position within a representative cylinder moving between top dead center (TDC) and bottom dead center (BDC).

The plot of FIG. 18 represents operation of a mechanical variable cam timing device according to the present disclosure with a baseline valve timing diagram similar to how a conventional camshaft operates. Line 522 represents the position or displacement of one or more exhaust valves per cylinder as they substantially simultaneously open and close relative to piston position line 520. Line 524 represents the position or displacement of one or more intake valves as they substantially simultaneously open and close relative to piston position line 520.

The plot of FIG. 19 illustrates how the duration of intake/exhaust valve opening events can be increased using a mechanical variable cam timing device in combination with a coaxial camshaft operating four valves per cylinder according to the present disclosure. Line 530 represents the position or displacement of a first exhaust valve while line 532 represents the position or displacement of a second exhaust valve on the same cylinder. Line 534 represents the position or displacement of a first intake valve and line 536 represents the position or displacement of a second intake valve on the same cylinder. As illustrated in the plot of FIG. 19, a mechanical device to selectively change phase relationship between the crankshaft (as represented by the piston position) and the camshaft according to the present disclosure may be used to increase the overall valve opening times relative to the baseline timing as represented by FIG. 18.

Figure 20:
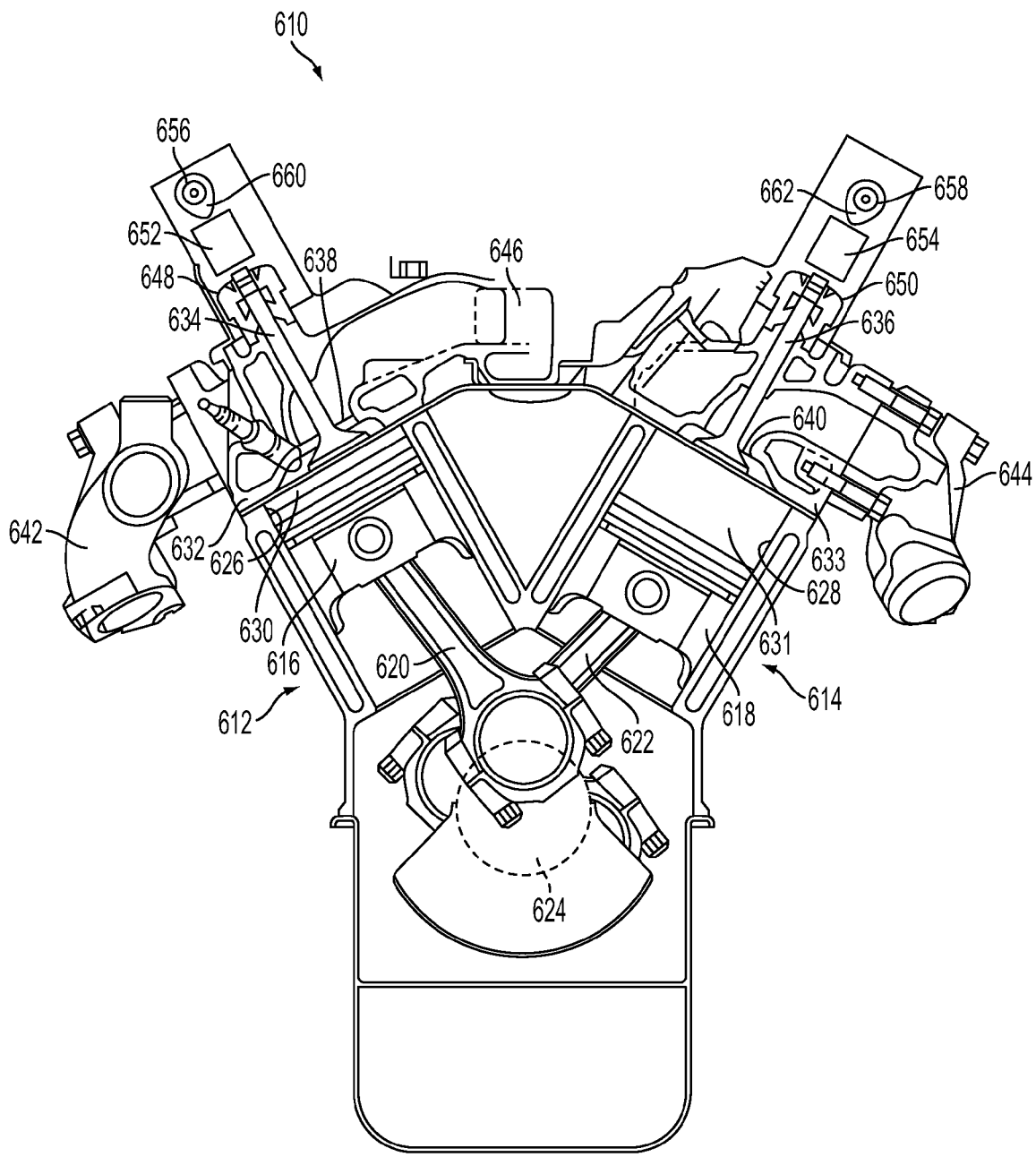
FIG. 20 is an end view of a vee-configured engine having a mechanical camshaft adjustment device for selectively deactivating valves according to the present disclosure.

In FIG. 20, an internal combustion engine 610 having a first bank 612 of cylinders and a second bank 614 of cylinders is shown. Only front pistons 616 and 618 are visible in FIG. 20. However, it is common for there to be 3 or 4 cylinders in each cylinder bank yielding V-6 or V-8 engines, respectively. Pistons 616 and 618 are coupled to a crankshaft 624 via connecting rods 620 and 622. Pistons 616 and 618 reciprocate within cylinders 626 and 628. The crank-slider mechanism of pistons 616 and 618, connecting rods 620 and 622 and crankshaft 624 convert the linear motion of pistons 616 and 618 into rotary motion at crankshaft 624. Above the pistons are combustion chambers 630 and 631 which are delimited by pistons 616 and 618, cylinders 626 and 628, and cylinder heads 632 and 633. Within cylinder heads 632 and 633, each cylinder is provided at least one intake valve and at least one exhaust valve. In the view shown in FIG. 20, only an intake poppet valve 634 is visible in cylinder head 632 and only an exhaust poppet valve 636 is visible in cylinder head 633. Behind intake poppet valve 634 is an exhaust poppet valve; similarly, behind exhaust poppet valve 636 is an intake poppet valve. Exhaust poppet valve 636 is shown in FIG. 20 as being depressed so that exhaust port 640 is open allowing fluid communication between combustion chamber 631 and exhaust manifold 644. Similarly, intake poppet valve 634 is shown as being depressed so that intake port 638 is open allowing fluid communication between combustion chamber 630 and intake manifold 646. Poppet valves 636 and 638 are normally in a non-depressed state, in which they are covering ports 638 and 640, respectively. Valves 634 and 636 are biased toward the closed position by valve springs 648 and 650, respectively. The spring forces are overcome when tappets 652 and 654 are depressed by cam lobes 660 and 662 coupled to camshafts 656 and 658, respectively. When camshafts 656 and 658 are rotated such that cam lobes 660 and 662 are not in contact with tappets 652 and 654, valves 634 and 636 are closed.

In FIG. 20, exhaust manifolds 642 and 644 are provided for cylinder heads 632 and 633, respectively. However, as is typical, only one intake manifold 646 is provided with intake runners for all engine cylinders. The intakes from the two banks may remain separated for a distance upstream and combined further upstream.

Figure 21:
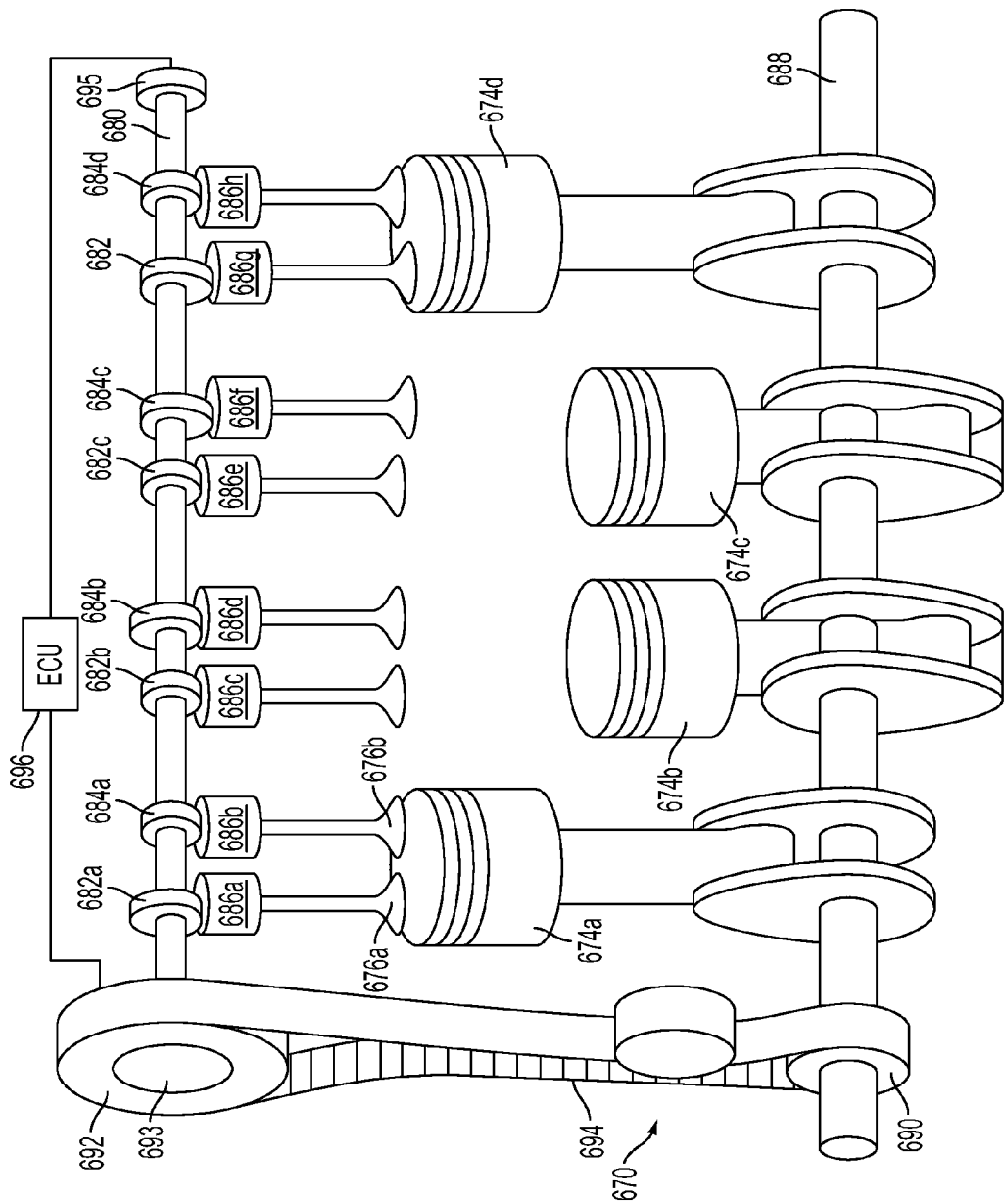
FIG. 21 is an isometric view of a four-cylinder engine bank showing a camshaft which actuates both intake and exhaust valves to provide selective valve deactivation according to the present disclosure.

Referring to FIG. 21, a single cylinder bank 670 having four reciprocating pistons 674a-d is shown. Pistons 674a-d reciprocate within cylinders (not shown. Each cylinder has an intake valve 676a-d and an exhaust valve 678a-d which are actuated by camshaft 680 having intake camshaft lobes 682a-d and exhaust camshaft lobes 684a-d, which press on tappets 686a-h to depress valves 676a-d and 678a-d. Pistons 674a-d are connected to crankshaft 688 via connecting rods. Crankshaft 688 is coupled to crankshaft sprocket 690. Camshaft 680 is coupled to camshaft sprocket 692. Crankshaft sprocket 690 drives camshaft sprocket 692 via belt drive 694. A chain drive may be used in place of belt drive 694. The drive ratio between camshaft sprocket 692 and crankshaft sprocket 690 is 2:1 so that camshaft 680 rotates at one-half speed of crankshaft 688. In a V-8 configured engine, two banks of cylinders, such as shown in FIG. 21 are coupled to the crankshaft and the crankshaft sprocket drives two camshafts.

Within camshaft 680 in FIG. 21 is a coaxial, concentric camshaft (not specifically illustrated in this Figure) as previously illustrated and described with respect to FIGS. 1-19. Lobes 682*a-d* are coupled to camshaft 680 with valves 684*a-d* coupled to the internal camshaft (such as a configuration shown in FIGS. 4-6), with the two camshafts being adjustable with respect to each other using any of a number of mechanical and/or hydraulic cam phasing devices, such as the mechanical device described herein. A camshaft adjuster (or phaser) 693 is shown coupled to camshaft 680 on the front of the engine. Adjuster 693 rotates both of the concentric camshafts when actuated. A camshaft adjuster 695 is coupled to the internal camshaft at the rear of the engine. Adjuster 695 rotates the internal camshaft with respect to camshaft 680 when actuated. In one embodiment, adjuster 693 is a hydraulic adjuster and adjuster 695 is a mechanical adjuster according to embodiments shown in the present disclosure. In another embodiment, both adjusters 693 and 695 are mechanical adjusters. An electronic control unit (ECU) 696 commands actuation of adjusters 693 and 695 based on current engine and/or ambient operating parameters and operating modes, such as a variable displacement operating mode, for example. In another alternative, lobes 682*a-d* are coupled to the internal camshaft with lobes 684*a-d* coupled to camshaft 680.

In yet another alternative, each cylinder has two intake valves and two exhaust valves actuated by two sets of coaxial camshafts such as shown in FIGS. 2A and 2B. One coaxial camshaft pair actuates all intake valves and the other coaxial camshaft pair actuates all exhaust valves.

Figure 22:
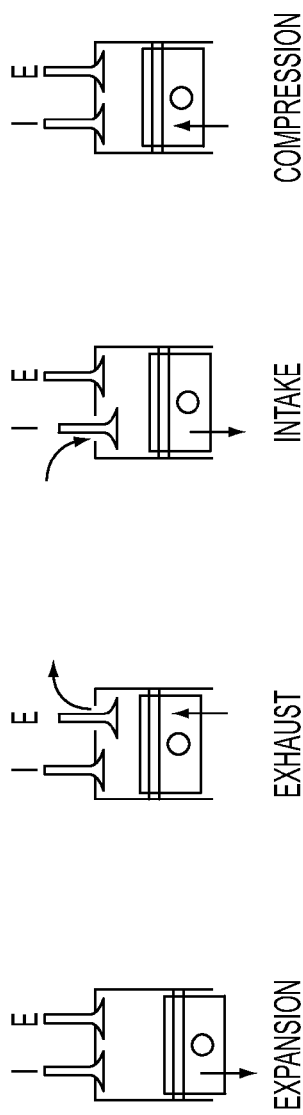
FIG. 22 is a graph showing piston position and valve lift during 720 degree of crankshaft rotation for a typical valve timing with activated cylinders according to the present disclosure.
Figure 22:
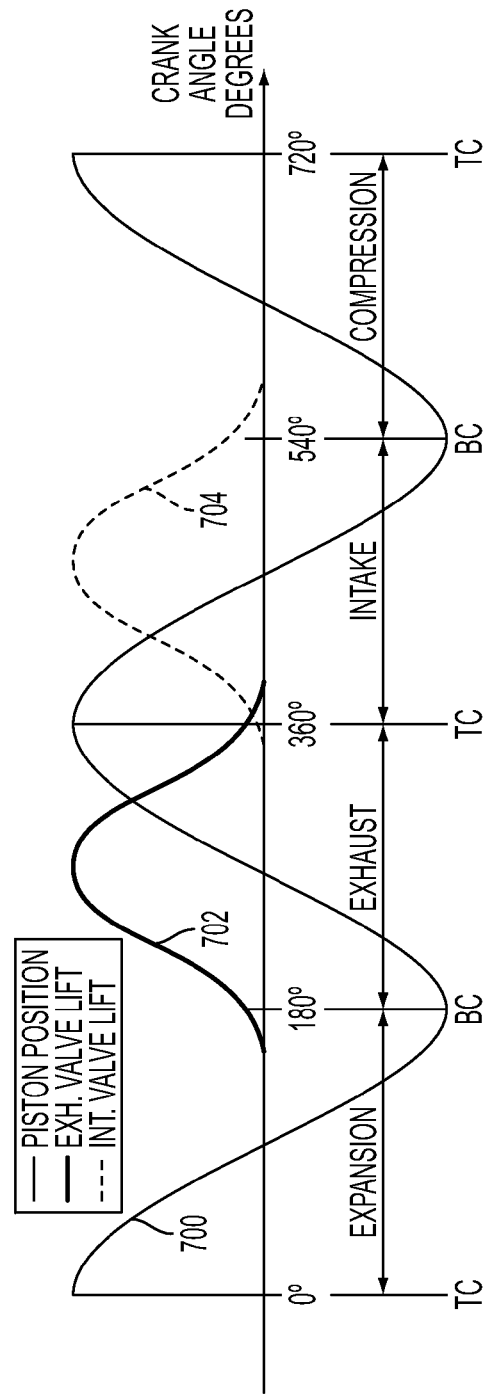

Referring now to FIG. 22, valve and piston events are shown on a crank angle degree plot for a representative engine cycle with the cylinders activated (firing). The four strokes of the four-stroke engine are: expansion, exhaust, intake, and compression, each of approximately 180 degrees in duration. Thus, the engine completes one complete set of processes in 720 crank degrees, with the piston strokes occurring between a top center (TC) position and a bottom center (BC) position as represented by line 700.

These strokes are used conventionally herein even when the cylinder is deactivated.

In FIG. 22, typical cam lifts are shown with the exhaust valve lift represented by line 702 and the intake valve lift represented by line 704. During expansion, high pressure developed in the combustion chamber from the combustion of gases acts upon the piston to provide the power to drive the engine. Both valves are closed to contain the pressure, with the exhaust valve opening a bit before the piston reaches BC. A retreating piston along with both valves closed is shown in FIG. 22A. As the piston travels from BC to TC (FIG. 22B), the exhaust valve is open to expel burned gases into the engine exhaust. Just before the piston reaches TC, the intake valve is begins opening and both valves are partially open for some period of time, called valve overlap. During the intake stroke (FIG. 22C), the intake valve is open while the piston travels from TC to BC, thereby pulling in fresh air from the engine intake. Following intake, both valves are closed and the piston travels from BC to TC (FIG. 22D) to compress the gases in the combustion chamber in preparation for a combustion event.

According to an embodiment of the disclosure, overall efficiency of the engine is improved at modest torque demand when one bank of cylinders operates with normal valve timings, such as in FIG. 22, and the other bank of cylinders is effectively deactivated by commanding valve timings that are shown in FIG. 23. The exhaust valve timing is advanced as represented by line 722 in FIG. 23 using a mechanical variable cam timing mechanism as previously described, relative to a typical valve event represented by line 702 in FIG. 22, such that the maximum lift position occurs at BC, i.e., the valve lift profile is substantially symmetrical with respect to BC. The intake valve lift, as represented by line 724 in FIG. 23, is retarded with respect to typical valve timing (line 704 in FIG. 22), such that the intake valve maximum lift occurs at BC and the lift profile is substantially symmetrical with respect to BC. The maximum lift of the exhaust valve occurs at the BC between expansion and exhaust and the maximum lift of the intake valve occurs at the BC between intake and compression.

Continuing with FIG. 23, during the first portion of expansion, the piston is traveling from TC to BC with both valves closed (FIG. 23A). In the middle portion of the expansion stroke, however, the exhaust valve begins to open. As the piston continues to move downward with the exhaust valve open, exhaust gases are pulled into the combustion chamber for the remainder of the expansion stroke, FIG. 23B. During the first part of the exhaust stroke, the piston passes through BC and begins upward movement toward TC with the exhaust valve open. The gases in the combustion chamber are expelled such as shown in FIG. 23C. The exhaust valve closes about the middle of the exhaust stroke. As both valves are closed from about 270 to 360 crank degrees, the gases trapped in the cylinder are compressed and a positive pressure develops in the cylinder. The valves remain closed for the first part of the intake stroke while the piston is traveling downwards from TC to BC, the expansion thereby relieving the pressure that developed during the later portion of the exhaust stroke. The later portion of the exhaust stroke and the early portion of the intake stroke are illustrated in FIG. 23D, showing both valves closed and the piston moving both upward during period D1 and downward during period D2. During the later portion of the intake stroke, the intake valve lifts off its seat and starts to open. As the piston is moving toward BC, gases are pulled into the combustion chamber through the open intake valve from the engine intake, FIG. 23E. The intake remains open after BC and, when the piston moves upward from BC, gases are expelled from the combustion chamber into the engine intake, FIG. 23F. The intake valve closes in the middle portion of the compression stroke. With both valves closed, the gases in the combustion chamber are compressed during the later portion of the compression stroke, FIG. 23G. The pressure developed in the later portion of the compression stroke is relieved during the first portion of the next expansion stroke when the piston travels downward from TC.

Continuing to refer to FIG. 23, during portion B of the expansion stroke, a first quantity of gases are inducted from the exhaust into the combustion chamber. During portion C of the exhaust stroke a second quantity of exhaust gases are exhausted from the combustion chamber into the exhaust. In one embodiment of the present disclosure, valve timing is controlled using a mechanical camshaft adjustment device such that the first and second quantities are substantially equal. The timing at which the first quantity equals the second quantity coincides approximately with maximum lift occurring at BC between expansion and exhaust, or with the valve event approximately symmetrical with respect to BC. For the intake valve event, during portion E of the intake stroke, a third quantity of gases is inducted into the combustion chamber from the intake by virtue of the piston moving downward. During portion F of the compression stroke, a fourth quantity of gases is exhausted from the combustion chamber into the exhaust. By timing the intake event according to an embodiment of the present disclosure, the third and fourth quantities are equal such that there is no net flow from the intake into the combustion chamber. That timing is approximately symmetrical with BC between the intake and compression strokes or with maximum lift at that BC. As illustrated in FIG. 23, valve timing is controlled to provide cylinder deactivation with substantially no valve overlap.

In an alternative embodiment, valve timing is controlled to facilitate exhaust flow from the exhaust to the intake. Higher levels of exhaust gases can be tolerated without impairing combustion stability at relatively higher engine torque operating conditions. High torque load also corresponds to a mode of engine operation that produces a higher concentration of nitrous oxide gasses in the engine exhaust, making a higher flow of exhaust gas recirculation desirable. If exhaust gases flow into the intake of deactivated cylinders, such gases mix with intake gases for activated cylinders. Such backflow in deactivated cylinders is achieved by one or both of: advancing the exhaust camshaft timing slightly with respect to symmetrical timing shown in FIG. 23 for the exhaust valve lift; and retarding the intake camshaft timing slightly with respect to the symmetrical timing shown in FIG. 23 for the intake valve lift.

Cylinder pressure is represented by line 730 in FIG. 23. The pressure during periods B and C is substantially exhaust pressure and during periods E and F is substantially intake pressure. The pressure rises in the cylinders during periods D1 and G, but is relieved in periods A and D2. As mentioned above, one problem in some prior art valve deactivation systems is that a substantial vacuum develops in the combustion chamber at periods in the cycle if both valves are caused to remain closed for multiple cycles. However, according to the disclosure, a significant vacuum does not develop over time because the valves open regularly to relieve the pressure, thereby mitigating the problem of oil pumping into the combustion chamber during the cylinder deactivation periods.

The valve events shown in FIG. 23 are symmetrical with respect to BC. However, many engines are known to have slightly different cam profiles on the opening side and the closing side. In this case, the lifts cannot be exactly symmetrical. Also, it is known that there is inertia in causing the gases to flow. Thus, there is a slight delay between the valve opening and the gases starting to flow into or out of the combustion chamber. Similarly, once a flow is established, there is inertia in that flow. These flow dynamics become more important as engine speed increases. The desired effect, according to an embodiment of the present development, is to have no net flow of intake gases or exhaust gases through the engine. That is, the amount of air inducted from the intake during period E of FIG. 23 should be roughly equal to the amount of air expelled into the intake during period F. At some operating conditions, particularly at high engine speed, the valve timing to achieve no net flow is displaced a few degrees from being symmetrical about BC. Thus, according to an embodiment of the disclosure, the valve timing is adjusted to obtain substantially no net flow of intake or exhaust gases.

It is common to provide an external exhaust gas recirculation system including a duct between the engine exhaust and the engine intake. The duct has a valve to control the amount of exhaust gases inducted by the engine intake. According to another embodiment of the present disclosure, a small net flow of exhaust gases into the intake system can be provided by advancing the exhaust valve timing slightly and retarding the intake valve timing slightly, in relation to the valve timings shown in FIG. 23. This can be used as an additional supply to supplement the exhaust gas recirculation system flow or to supplant the exhaust gas recirculation flow for certain operating conditions.

In yet another embodiment, the exhaust valve timing is very slightly advanced and/or the intake valve timing is very slightly retarded (from what is shown in FIG. 23) so that the net flow is a slight exhaust flow into the intake. It is known that it is often undesirable to provide excess oxygen to exhaust systems in which a three-way catalyst is deployed. Selecting valve timings which cause a small exhaust flow to the intake ensures that no oxygen leaks to the three-way catalyst.

Figure 24:
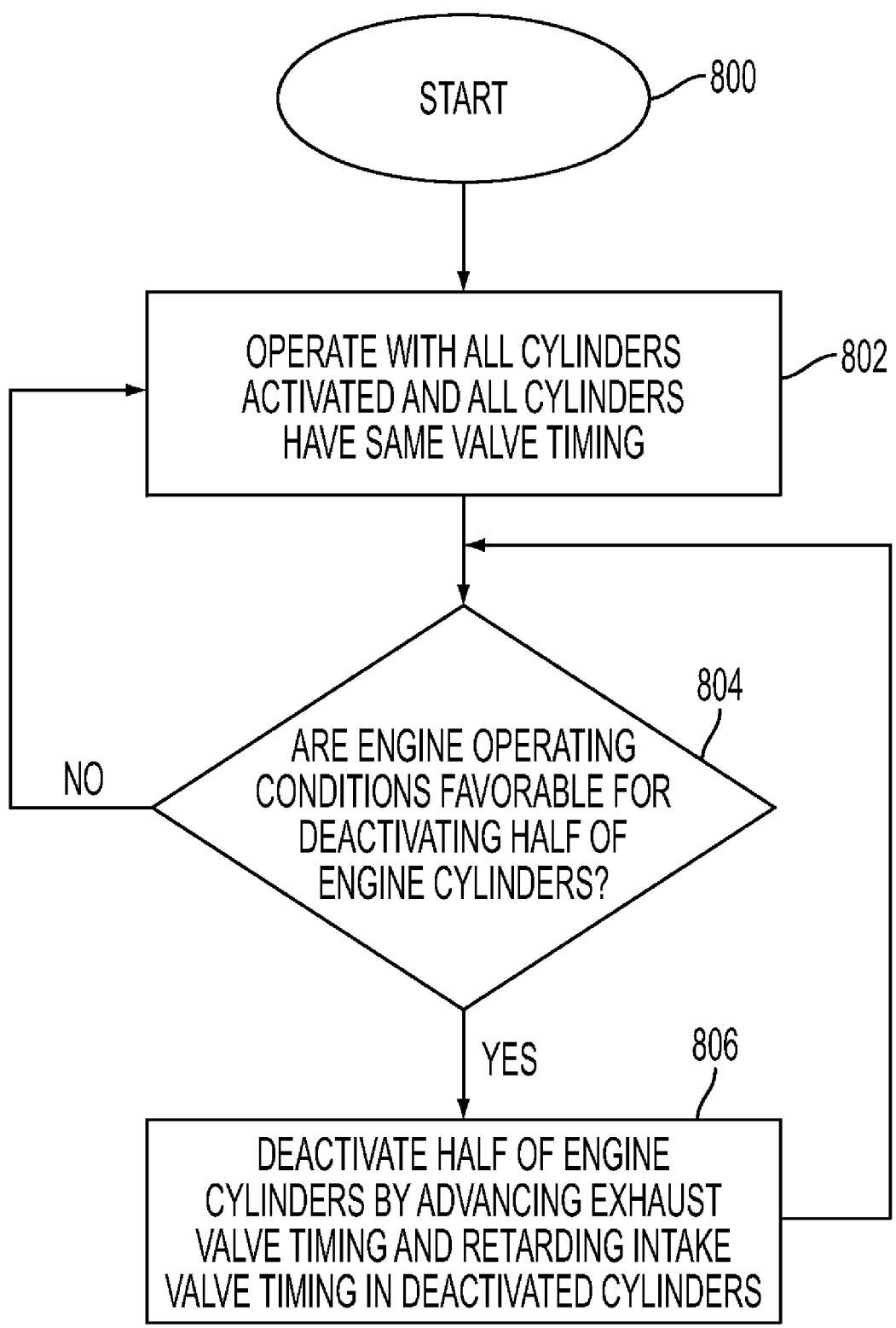
FIG. 24 is a flowchart illustrating operation of a system or method for controlling an engine to provide variable displacement operation using valve timing to selectively deactivate cylinders according to an embodiment of the present disclosure.

FIG. 24 is a flowchart illustrating operation of a system or method for operating an engine in a variable displacement mode using variable cam timing to deactivate one or more cylinders according to the present disclosure. As those of ordinary skill in the art will understand, the functions represented by the flow chart blocks may be performed by software and/or hardware. Depending upon the particular processing strategy, such as event-driven, interrupt-driven, etc., the various functions may be performed in an order or sequence other than illustrated in the Figure. Similarly, one or more steps or functions may be repeatedly performed, or omitted, although not explicitly illustrated. In one embodiment, various functions are primarily implemented by software, instructions, or code stored in a computer readable storage medium and executed by a microprocessor-based computer or controller to control operation of the engine to selectively operate in a variable displacement mode by controlling a mechanical valve adjustment device to deactivate one or more cylinders. In FIG. 24, the engine is started at 800 and operation starts with all engine cylinders activated as represented by block 802. In 804 it is determined whether engine conditions are favorable for operating in a variable displacement mode by deactivating one or more cylinders. In the illustrated embodiment, an entire cylinder bank is deactivated. Engine/vehicle and/or ambient operating conditions may include torque levels that are less than half of the maximum torque that the engine can produce, for example. In some applications, it may be undesirable to operate with only half of the engine cylinders firing due to vibration. Also, it may be desirable to wait until the engine warms up prior to deactivating one or more engine cylinders. If a negative results in 804, control passes back to 802. If a positive results in 804, half (or one engine bank) of engine cylinders are deactivated by advancing exhaust valve timing so that the maximum lift is approximately at BC and retarding intake valve timing so that the maximum lift is approximately at BC to provide substantially no valve overlap.

As illustrated in FIGS. 1-24, a method for deactivating cylinders according to the present disclosure may include changing relative rotational phase between first and second rotating shafts in an internal combustion engine to provide substantially no valve overlap and no net flow of intake or exhaust gases during cylinder deactivation. In one embodiment, concentric intake and exhaust camshafts are phased to provide substantially no net flow of intake or exhaust gases during cylinder deactivation by biasing a first worm assembly 102 to apply a clockwise rotational bias torque between the first shaft 110 and second shaft 112, and biasing a second worm assembly 104 to apply a counterclockwise rotational bias torque between the first and second shafts 110, 112 to maintain the rotational phase between the first and second camshafts during steady-state rotation, i.e. other than during phase change actuation. An actuating torque is applied through the front side gear 116 and associated worm pinions 120, 122 to the first and second worm assemblies 102, 104 during phase change actuation to selectively change the rotational phase by advancing rotation of shaft 112 relative to shaft 110 while the shafts are rotating.

As such, the systems and methods of the present disclosure provide a mechanical variable camshaft timing device that can be used to adjust the phase relationship between two rotating shafts of an internal combustion engine to provide substantially no valve overlap and no net flow of intake or exhaust gases for deactivated cylinders. Various embodiments have the variable cam timing device adjusting the phase relationship between the camshaft and crankshaft and/or the phase relationship between coaxial camshafts operating intake and/or exhaust valves. Embodiments of the present disclosure provide compact packaging with desired reliability and durability such that the device can be implemented without increasing the length of camshaft bearings and with minimal or no overall increase in engine length. Opposite hand preload torque reduces or effectively eliminates backlash during operation of the device to reduce noise and wear. Friction locking within the advance/retard mechanism maintains the angular relationship between associated rotating shafts under dynamic loading during operation to reduce or eliminate need for ongoing adjustments by the actuating device. The virtually unlimited range of control of a variable cam timing device according to the present disclosure allows both the intake and the exhaust valves to be centered about different bottom centers such that there is no overlap to leak exhaust gasses into the intake manifold that is still operating firing cylinders on another engine bank. Furthermore, a variable cam timing device according to the present disclosure facilitates maintaining positive pressure within the deactivated cylinders to prevent oil from migrating past the piston rings into the combustion chamber.

While the best mode has been described in detail, those familiar with the art will recognize various alternative designs and embodiments within the scope of the following claims. While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to: cost, strength, durability, life cycle cost, marketability, appearance, packaging, size, serviceability, weight, manufacturability, ease of assembly, etc. The embodiments discussed herein that are described as less desirable than other embodiments or prior art implementations with respect to one or more characteristics are not outside the scope of the disclosure and may be desirable for particular applications.

What is claimed:

1. A method to operate a four-stroke, internal-combustion engine having first-bank cylinders and second-bank cylinders, a first intake camshaft actuating intake poppet valves coupled to the first-bank cylinders, a first exhaust camshaft actuating exhaust poppet valves coupled to the first-bank cylinders, a second intake camshaft actuating intake poppet valves coupled to the second-bank cylinders, and a second exhaust camshaft actuating exhaust poppet valves coupled to the second-bank cylinders, a first intake camshaft adjuster coupled to the first intake camshaft, and a first exhaust camshaft adjuster coupled to the first exhaust camshaft, the method comprising:

commanding the first exhaust camshaft adjuster to adjust the first exhaust camshaft to a position such that a first quantity of gases inducted into the first-bank cylinders from an engine exhaust is at least as much as a second quantity of gases exhausted from the first-bank cylinders into an engine exhaust wherein the commanding of the first exhaust camshaft adjuster causes the first exhaust camshaft to rotate with respect to the first intake camshaft.

2. The method of claim 1, further comprising:

commanding the first intake camshaft adjuster to adjust the first intake camshaft to a position such that a third quantity of gases inducted into a cylinder from an engine intake is less than or equal to a fourth quantity of gases exhausted from a cylinder into an engine intake.

3. The method of claim 2 wherein the third quantity and the fourth quantity are substantially equal.

4. The method of claim 2 wherein the engine has reciprocating pistons within engine cylinders; the pistons undergo four strokes which include expansion, exhaust, intake, and compression repeating in such order; and the position of the first intake camshaft is such that a maximum lift of first-bank intake valves occurs proximate in time with the pistons passing through a bottom center between intake and compression strokes.

5. The method of claim 1, wherein the first quantity and the second quantity are substantially equal.

6. The method of claim 1 wherein the engine has reciprocating pistons within engine cylinders; the pistons undergo four strokes which include expansion, exhaust, intake, and compression repeating in such order; and the position of the first exhaust camshaft is such that a maximum lift of first-bank exhaust valves occurs proximate in time with the pistons passing through a bottom center between expansion and exhaust strokes.

7. The method of claim 1 wherein the first intake camshaft and the first exhaust camshaft are coaxial and the commanding comprises advancing the first exhaust camshaft with respect to the first intake camshaft.

8. The method of claim 1 wherein the first intake camshaft and the first exhaust camshaft are coaxial and the first intake camshaft adjuster and the first exhaust camshaft adjuster are mechanical adjusters.

9. The engine of claim 1, further comprising:

an electronic control unit coupled to the first intake and exhaust camshaft adjusters, the electronic control unit commanding the first exhaust camshaft to provide the maximum lift of first-bank exhaust valves substantially at bottom center between expansion and exhaust strokes and commanding the first intake camshaft to provide the maximum lift of first-bank intake valves substantially at bottom center between intake and compression strokes wherein the first exhaust camshaft and the first intake camshaft are adjusted in response to a determination that first bank cylinders are to be deactivated.

10. A method to operate a four-stroke, internal-combustion engine having first and second banks of cylinders, a first intake camshaft actuating intake poppet valves coupled to first-bank cylinders, a first exhaust camshaft actuating exhaust poppet valves coupled to the first-bank cylinders, a second intake camshaft actuating intake poppet valves coupled to second-bank cylinders, and a second exhaust camshaft actuating exhaust poppet valves coupled to the second-bank cylinders, a first intake camshaft adjuster coupled to the first intake camshaft and a first exhaust camshaft adjuster coupled to the first exhaust camshaft, the method comprising:

determining whether to operate in a deactivated mode in which the first-bank cylinders are deactivated and the second-bank cylinders are activated or in a fully active mode in which all cylinders are activated; and commanding the first intake camshaft adjuster and the first exhaust camshaft adjuster to provide valve phasings such that a net flow of gases from an exhaust to an intake in first-bank cylinders is greater than or equal to zero, wherein the first intake camshaft adjuster is a mechanical adjuster, the first exhaust camshaft adjuster is a mechanical adjuster, the first exhaust camshaft is advanced, the first intake camshaft is retarded, and the commanding is in response to a determination of deactivated mode.

11. The method of claim 10, further comprising: commanding the first and second intake camshaft adjusters to provide substantially identical valve phasing for all intake valves and the first and second exhaust camshaft adjusters to provide substantially identical valve phasing for all exhaust valves in response to a determination of fully active mode.

12. The method of claim 10 wherein the net flow of gases from an exhaust to an intake in deactivated mode is substantially zero.

13. The method of claim 10 wherein the first intake camshaft and the first exhaust camshaft are coaxial and there is no valve overlap period.

14. The method of claim 10 wherein the commanding comprises:
advancing the exhaust camshaft timing with respect to the intake camshaft timing, the exhaust and intake camshafts being coaxial with one of the intake and exhaust camshafts being an inner camshaft and the other of the intake and exhaust camshafts being an outer camshaft and the advancing is accomplished by rotating the inner camshaft with respect to the outer camshaft.

15. A four-stroke, internal combustion engine
having first and second banks of cylinders, a crankshaft coupled to pistons reciprocating in first-bank cylinders and pistons reciprocating in second-bank cylinders, a first intake camshaft actuating intake poppet valves and a first exhaust camshaft actuating exhaust poppet valves coupled to the first-bank cylinders, and a second intake camshaft actuating intake poppet valves and a second exhaust camshaft actuating exhaust poppet valves coupled to the second-bank cylinders, the four strokes including expansion, exhaust, intake, and compression occurring repeatedly in such order, the engine comprising:

a first intake camshaft adjuster coupled to the first intake camshaft; and
a first exhaust camshaft adjuster coupled to the first exhaust camshaft, wherein
the first intake camshaft and the first exhaust camshaft are coaxial, and wherein:
the first exhaust camshaft adjuster positions the first exhaust camshaft so a maximum valve lift of exhaust valves associated with the first-bank cylinders is adjusted such that there is substantially no net flow into associated cylinders during exhaust valve actuation; and
the first intake camshaft adjuster positions the first intake camshaft so a maximum valve lift of intake valves associated with the first-bank cylinders is adjusted such that there is substantially no net flow into associated cylinders during intake valve actuation.

16. The engine of claim 15 wherein the first exhaust camshaft adjuster and the first intake camshaft adjuster are mechanical adjusters and the first exhaust camshaft adjuster and the first intake camshaft adjuster are positioned such that:
a maximum valve lift of exhaust valves associated with second-bank cylinders occurs during a middle portion of the exhaust stroke; and
a maximum valve lift of intake valves associated with second-bank cylinders occurs during a middle portion of the intake stroke.

17. The engine of claim 16 wherein the middle portion of the intake stroke is a middle third of the intake stroke, and the middle portion of the exhaust stroke is a middle third of the exhaust stoke.

18. The engine of claim 16 wherein each stroke occurs in 180 degrees of crank rotation, beginning of expansion is defined as 0 crank degrees, the maximum valve lift of second-bank intake valves occurs in the range of 420 and 480 degrees of crank rotation and the maximum lift of second-bank exhaust valves occurs in the range of 240 and 300 degrees of crank rotation.

19. The engine of claim 15 wherein the first exhaust camshaft adjuster is positioned such that exhaust valve actuation occurs symmetrical with respect to bottom center between the expansion and exhaust strokes.

20. The engine of claim 15 wherein the first intake camshaft adjuster is positioned such that intake valve actuation occurs symmetrical with respect to bottom center between the intake and compression strokes.

* * * * *